US012664433B1

(12) United States Patent
Bhat et al.

(10) Patent No.: US 12,664,433 B1
(45) Date of Patent: Jun. 23, 2026

(54) HIERARCHICAL MULTI-LEVEL MODEL DISTILLATION

(71) Applicant: Citibank, N.A., New York, NY (US)

(72) Inventors: Ganesh Prasad Bhat, West Orange, NJ (US); Nikhil Arunkumar Joshi, Dallas, TX (US); Venkata Uttam Kumar Chunduri, Jersey City, NJ (US); Yinan Zhai, New York City, NY (US); Zainab Vora, Jersey City, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/372,996

(22) Filed: Oct. 29, 2025

(51) Int. Cl.
*G06N 3/082* (2023.01)
*G06N 3/0475* (2023.01)

(52) U.S. Cl.
CPC ........... *G06N 3/082* (2013.01); *G06N 3/0475* (2023.01)

(58) Field of Classification Search
CPC .............................. G06N 3/082; G06N 3/0475; G06F 18/24765; G06F 18/285; H04L 9/50
See application file for complete search history.

(56) References Cited

U.S. PATENT DOCUMENTS

| | | | |
|---|---|---|---|
| 2024/0104346 A1* | 3/2024 | Hou ........................ | G06N 3/045 |
| 2025/0217418 A1* | 7/2025 | Bathwal .............. | G06F 16/9538 |
| 2025/0272561 A1* | 8/2025 | Gunasekaran ....... | G06N 3/0495 |
| 2026/0037806 A1* | 2/2026 | Kim ........................ | G06N 3/048 |

OTHER PUBLICATIONS

Ramirez, Guillem, et al. "Cache & distil: optimising api calls to large language models." arXiv preprint arXiv:2310.13561 (2023). (Year: 2023).*
Dettmers, Tim, et al. "Qlora: Efficient finetuning of quantized llms." Advances in neural information processing systems 36 (2023):10088-10115. (Year: 2023).*
Bai, Guangji, et al. "Beyond efficiency: A systematic survey of resource-efficient large language models." arXiv preprint arXiv:2401.00625 (2024). (Year: 2024).*

(Continued)

*Primary Examiner* — Randall K. Baldwin
(74) *Attorney, Agent, or Firm* — Perkins Coie LLP; Sumedha Ahuja; Willa Wu

(57) ABSTRACT

The present disclosure provides systems and methods for hierarchical multi-level model distillation that create specialized artificial intelligence models from large language models. A hierarchy for generating specialized generative models from a large language model is determined, including models associated with different categories and complexity levels for tasks with varying computational requirements. The specialized models are trained using the large language model based on specific categories to provide responses to category-related requests. Each model is pruned based on complexity levels to enable responses to requests of varying complexity. The models are quantized from common precision factors to corresponding precision factors associated with complexity levels. Deployment locations are determined for each pruned model based on complexity levels. Specialized models are transmitted to corresponding locations for deployment across diverse computational environments.

20 Claims, 9 Drawing Sheets

(56) References Cited

OTHER PUBLICATIONS

Liu, Zechun, et al. "Llm-qat: Data-free quantization aware training for large language models." Findings of the Association for Computational Linguistics: ACL 2024. 2024. (Year: 2024).*

Petrenko, Mykhailo. "Language model optimization using pruning, distillation and quantization techniques for NLP tasks." (2024). (Year: 2024).*

Mussa, Aman, Zhanseit Tuimebayev, and Madina Mansurova. "Make Large Language Models Efficient: A Review." IEEE Access (Sep. 2025). (Year: 2025).*

Girija, Sanjay Surendranath, et al. "Optimizing llms for resource-constrained environments: A survey of model compression techniques." 2025 IEEE 49th Annual Computers, Software, and Applications Conference (COMPSAC). IEEE, Jul. 2025. (Year: 2025).*

Zhang, Dingzong, et al. "Distilling Wisdom: A Review on Optimizing Learning From Massive Language Models." IEEE Access (Mar. 2025). (Year: 2025).*

Ma, Ziyang, et al. "Model Hemorrhage and the Robustness Limits of Large Language Models." arXiv preprint arXiv:2503.23924 (Mar. 2025). (Year: 2025).*

Shi, Yanting, et al. "SoK: On-Device Large Language Model Personalization for Meta Computing." 2024 International Conference on Meta Computing (ICMC). IEEE, 2024. (Year: 2024).*

Li, Rui, et al. "Efficient LLMs training and inference: An introduction." IEEE Access 13 (2024): 32944-32970. (Year: 2024).*

Guo, Cong, et al. "A survey: Collaborative hardware and software design in the era of large language models." IEEE Circuits and Systems Magazine 25.1 (Feb. 2025): 35-57. (Year: 2025).*

U.S. Appl. No. 19/375,105, filed Oct. 30, 2025, Ganesh Prasad Bhat, Hierarchical Small Language Model Cascade for Multi-Stage Classification.

* cited by examiner

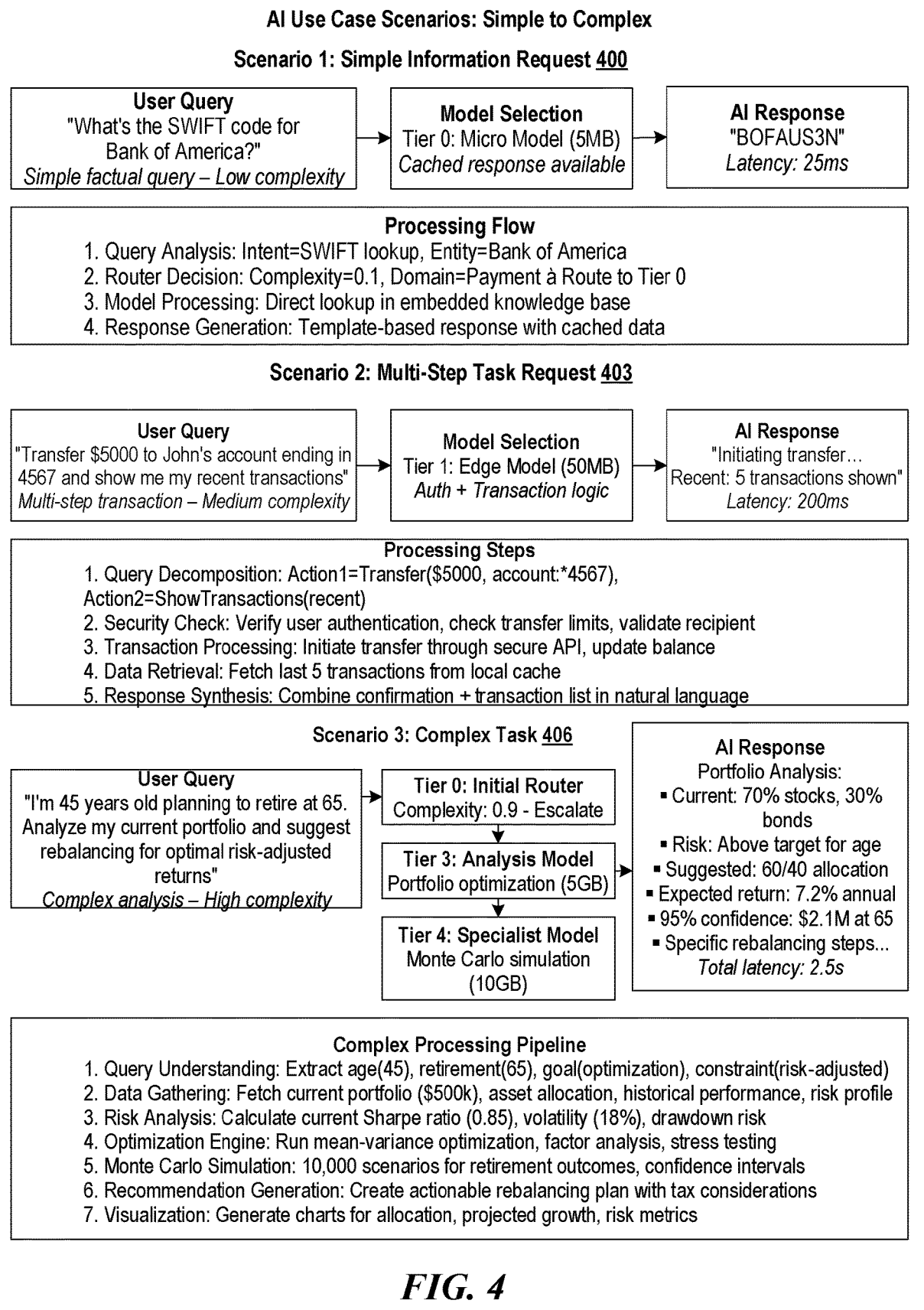

AI Use Case Scenarios: Simple to Complex

Scenario 1: Simple Information Request 400

| User Query | Model Selection | AI Response |
|---|---|---|
| "What's the SWIFT code for Bank of America?" *Simple factual query – Low complexity* | Tier 0: Micro Model (5MB) *Cached response available* | "BOFAUS3N" *Latency: 25ms* |

Processing Flow
1. Query Analysis: Intent=SWIFT lookup, Entity=Bank of America
2. Router Decision: Complexity=0.1, Domain=Payment à Route to Tier 0
3. Model Processing: Direct lookup in embedded knowledge base
4. Response Generation: Template-based response with cached data

Scenario 2: Multi-Step Task Request 403

| User Query | Model Selection | AI Response |
|---|---|---|
| "Transfer $5000 to John's account ending in 4567 and show me my recent transactions" *Multi-step transaction – Medium complexity* | Tier 1: Edge Model (50MB) *Auth + Transaction logic* | "Initiating transfer... Recent: 5 transactions shown" *Latency: 200ms* |

Processing Steps
1. Query Decomposition: Action1=Transfer($5000, account:*4567), Action2=ShowTransactions(recent)
2. Security Check: Verify user authentication, check transfer limits, validate recipient
3. Transaction Processing: Initiate transfer through secure API, update balance
4. Data Retrieval: Fetch last 5 transactions from local cache
5. Response Synthesis: Combine confirmation + transaction list in natural language

Scenario 3: Complex Task 406

| User Query | | AI Response |
|---|---|---|
| "I'm 45 years old planning to retire at 65. Analyze my current portfolio and suggest rebalancing for optimal risk-adjusted returns" *Complex analysis – High complexity* | Tier 0: Initial Router Complexity: 0.9 - Escalate ↓ Tier 3: Analysis Model Portfolio optimization (5GB) ↓ Tier 4: Specialist Model Monte Carlo simulation (10GB) | Portfolio Analysis: ▪ Current: 70% stocks, 30% bonds ▪ Risk: Above target for age ▪ Suggested: 60/40 allocation ▪ Expected return: 7.2% annual ▪ 95% confidence: $2.1M at 65 ▪ Specific rebalancing steps... *Total latency: 2.5s* |

Complex Processing Pipeline
1. Query Understanding: Extract age(45), retirement(65), goal(optimization), constraint(risk-adjusted)
2. Data Gathering: Fetch current portfolio ($500k), asset allocation, historical performance, risk profile
3. Risk Analysis: Calculate current Sharpe ratio (0.85), volatility (18%), drawdown risk
4. Optimization Engine: Run mean-variance optimization, factor analysis, stress testing
5. Monte Carlo Simulation: 10,000 scenarios for retirement outcomes, confidence intervals
6. Recommendation Generation: Create actionable rebalancing plan with tax considerations
7. Visualization: Generate charts for allocation, projected growth, risk metrics

*FIG. 4*

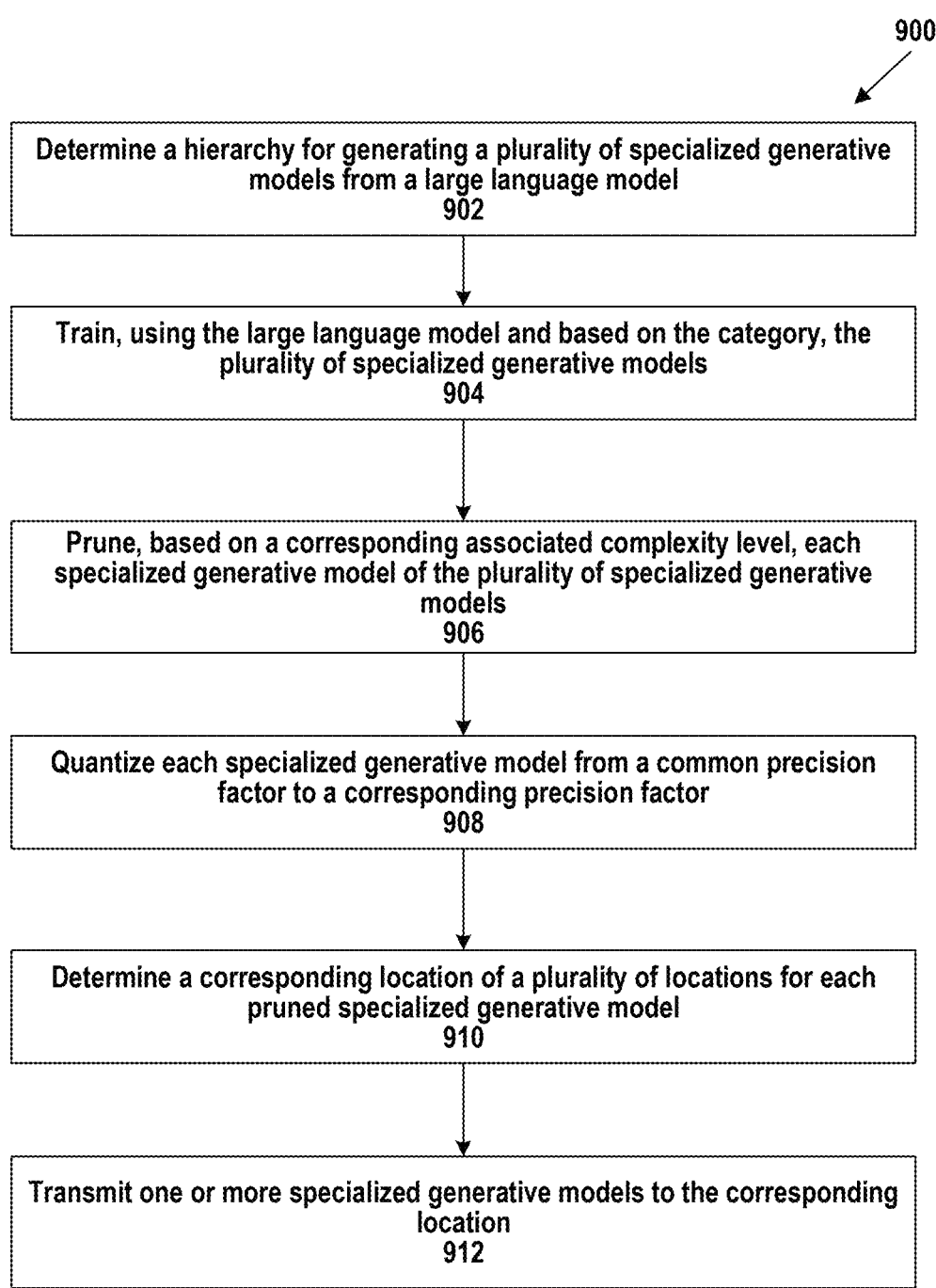

900

Determine a hierarchy for generating a plurality of specialized generative models from a large language model
902

Train, using the large language model and based on the category, the plurality of specialized generative models
904

Prune, based on a corresponding associated complexity level, each specialized generative model of the plurality of specialized generative models
906

Quantize each specialized generative model from a common precision factor to a corresponding precision factor
908

Determine a corresponding location of a plurality of locations for each pruned specialized generative model
910

Transmit one or more specialized generative models to the corresponding location
912

*FIG. 9*

HIERARCHICAL MULTI-LEVEL MODEL DISTILLATION

BACKGROUND

Large language models and artificial intelligence systems have demonstrated remarkable capabilities across diverse applications, from natural language processing to complex reasoning tasks. However, their deployment faces substantial challenges related to computational resource requirements and operational efficiency. Modern AI systems typically require significant computational resources, making deployment across different hardware environments problematic. State-of-the-art models often contain billions of parameters, necessitating substantial memory and processing power that may not be available in edge computing environments such as mobile devices, embedded systems, or resource-constrained servers. This creates a fundamental tension between model capability and practical deployment constraints.

SUMMARY

Current approaches to addressing these challenges often involve deploying either a single large model for all use cases or manually creating separate models for different scenarios. Single large model deployments waste computational resources on simple queries while potentially failing to meet latency requirements for real-time applications. Manual model creation approaches lack systematic optimization and fail to maintain consistency across different model variants. Therefore, a systematic approach that can automatically generate hierarchies of models with varying computational requirements while maintaining performance across different types of queries and deployment environments would be beneficial.

A model generation system may be used to perform operations discussed herein. The model generation system may determine a hierarchy for generating multiple specialized generative models from a large language model. The hierarchy may include the specialized models associated with a category. Furthermore, each model may be associated with a different complexity level for performing tasks with different complexities. The system may then train the specialized generative models using the large language model and based on the category. The specialized generative models may be trained to provide responses to requests associated with the category. The system may then prune each specialized generative model based on its corresponding complexity level, enabling each model to respond to different requests of different complexity based on that complexity level. Furthermore, the system may quantize each specialized generative model from a common precision factor to a corresponding precision factor, such that a given precision factor may be associated with a corresponding complexity level. The model generation system may also determine a corresponding location for each pruned specialized generative model based on the corresponding complexity level and may transmit one or more specialized generative models to the corresponding location.

The model generation system may establish a structured framework for creating multiple artificial intelligence models with different capabilities. Specifically, the model generation system may determine a hierarchy for generating a plurality of specialized generative models from a large language model. The hierarchy may include a multitude of specialized generative models associated with a category of a plurality of categories. In addition, each specialized generative model may be associated with a different complexity level for performing tasks with different complexities. For example, the system may create a hierarchy where simple query processing models are designated as Tier 0 with minimal complexity, transaction processing models as Tier 1 with moderate complexity, and analytical models as Tier 3 with high complexity.

The model generation system may create different tier/complexity/side or domain-specific artificial intelligence models through knowledge transfer from a master model. Specifically, the model generation system may train, using the large language model and based on the category, the plurality of specialized generative models, such that the plurality of specialized generative models may be trained to provide responses to requests associated with the category. For example, the system may train specialized models for payment processing by using a foundation model to generate training data specific to transaction handling, account lookups, and payment validation tasks.

The model generation system may reduce the size and computational requirements of each artificial intelligence model based on its intended use case. Specifically, the model generation system may prune, based on a corresponding associated complexity level, each specialized generative model of the plurality of specialized generative models. Each specialized generative model, when pruned, may be enabled to respond to different requests of different complexity based on the corresponding associated complexity level. For example, a simple query processing model may have unnecessary neural network layers and attention heads removed to create a lightweight model capable of handling basic information requests.

In some implementations, the model generation system may establish a hierarchical structure of domain-specific models where each level represents increasingly specialized subsets of artificial intelligence capabilities. The hierarchy may begin with broad foundational categories and progressively narrow to specific implementation domains. At the top level, the system may define general application domains such as Financial Services, Healthcare, or Customer Support. Each of these primary domains may then be subdivided into more specific functional areas that represent distinct operational categories within the broader domain.

The hierarchical relationship may be established such that each level inherits capabilities from its parent level while adding specialized knowledge and functionality. Level 2 models may derive their foundational language understanding and reasoning capabilities from the Level 1 domain model, while incorporating specific knowledge relevant to their functional area. For instance, Transaction Processing Models may inherit general financial terminology and regulatory knowledge from the Financial Services domain while adding specialized understanding of payment protocols, security requirements, and transaction validation procedures.

Level 3 models may further specialize by focusing on particular operational tasks within their Level 2 category. Payment Validation Models may inherit transaction processing capabilities while concentrating on specific validation algorithms, compliance checks, and authentication procedures. This specialization may involve training on datasets that are increasingly focused on the specific use case, allowing the model to develop deeper expertise in narrow functional areas.

Level 4 models may represent the most specialized implementations, designed for specific operational scenarios or hardware constraints. Real-time Fraud Detection Models may inherit payment validation capabilities while being optimized for low-latency processing and specific fraud detection patterns. These models may be pruned and quantized to meet strict performance requirements while maintaining accuracy for their specialized tasks.

The model generation system may create training pathways that respect these hierarchical relationships, where knowledge distillation may flow from broader to more specific models. Each level may serve as a teacher model for the levels below it, ensuring that specialized knowledge is preserved while reducing computational complexity. The system may also implement cross-level validation, where higher-level models may provide oversight or fallback capabilities for more specialized models when they encounter queries outside their domain expertise.

The model generation system may optimize the numerical precision of model parameters to balance accuracy with computational efficiency. Specifically, the model generation system may quantize, based on a corresponding accuracy level, each specialized generative model from a common precision factor to a corresponding precision factor, where a given precision factor is associated with a corresponding complexity level of the plurality of complexity levels. For example, edge deployment models may be quantized from 32-bit floating point precision to 8-bit integer precision to reduce memory requirements while maintaining acceptable accuracy for simple tasks.

The model generation system may assign deployment locations for each artificial intelligence model based on its computational requirements and intended use. Specifically, the model generation system may determine, based on the corresponding complexity level of the plurality of complexity levels, a corresponding location of a plurality of locations for each pruned specialized generative model. For example, lightweight models may be assigned to mobile devices or edge servers, while complex analytical models may be designated for cloud-based deployment with high-performance computing resources.

The model generation system may distribute the optimized artificial intelligence models to their designated deployment environments. Specifically, the model generation system may transmit one or more specialized generative models to the corresponding location. For example, the system may deploy micro-models to mobile banking applications, intermediate models to branch terminals, and sophisticated models to central cloud servers.

According to other aspects of the present disclosure, the model generation system may include one or more of the following features. In some implementations, the model generation system may receive category information as a natural language query and use a special model or an LLM to determine the category. Thus, the model generation system may receive a request to generate the plurality of specialized generative models, such that the request includes a natural language concept. The model generation system may then generate, using the large language model or another suitable mechanism, the category associated with the natural language concept. The model generation system may determine the hierarchy based on the category.

The model generation system may train the specialized generative models by generating and transmitting requests of a particular category to a teacher model or another suitable model and then using the requests and responses to train the smaller, more specialized models. In particular, the model generation system may generate, based on the category, a plurality of requests for the large language model to obtain a plurality of responses from the large language model. Each request may be related to the category. The model generation system may then input the plurality of requests and the plurality of responses into a corresponding training routine of each specialized generative model of the plurality of specialized generative models. Each training routine may then train each specialized generative model using the plurality of requests and the plurality of responses.

The model generation system may then use the following operations to prune each model for a particular use (e.g., a particular size, subcategory, etc.). In particular, the model generation system may determine, for each portion of a plurality of portions of a first specialized generative model, a matching metric that indicates how well a corresponding portion of the plurality of portions matches the category. In some implementations, the portions may include neurons, attention heads, or layers. The model generation system may then prune one or more portions of the first specialized generative model where the matching metric does not meet a match threshold.

In network intrusion detection applications, the model generation system may create a hierarchical structure of specialized generative models designed to detect cybersecurity threats with varying levels of sophistication. The system may establish a multi-tier detection framework where lightweight models handle basic threat identification while more complex models analyze sophisticated attack patterns. For example, Tier 0 micro-models may be deployed at network edge devices to detect simple intrusion attempts such as basic port scanning, brute force login attempts, or straightforward denial-of-service attacks. These models may operate with minimal computational overhead and may provide rapid initial screening of network traffic patterns.

Tier 1 edge models may be positioned at network gateways to identify intermediate-complexity threats including protocol anomalies, suspicious data exfiltration patterns, or coordinated attack sequences that require analysis of multiple network packets or sessions. These models may incorporate moderate computational resources while maintaining real-time processing capabilities for high-volume network traffic.

Tier 2 branch models may be deployed at regional security operations centers to analyze complex multi-vector attacks, advanced persistent threats, or sophisticated evasion techniques that require deeper contextual understanding and pattern recognition across extended time periods. These models may process aggregated security data from multiple network segments and may correlate threat indicators across different attack vectors.

Tier 3 cloud models may handle the most sophisticated cybersecurity challenges including zero-day exploit detection, advanced malware analysis, or nation-state level attack campaigns that require comprehensive threat intelligence correlation and behavioral analysis across enterprise-wide network infrastructures. These models may utilize substantial computational resources and may access extensive threat databases for comprehensive security assessment.

The hierarchical intrusion detection system may implement progressive escalation mechanisms where simpler models may flag potential threats for analysis by more sophisticated models when attack patterns exceed their detection capabilities. This approach may enable organizations to balance computational efficiency with comprehensive threat coverage across diverse network environments.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 4 illustrates a use case for generative model distillation, in accordance with one or more embodiments of this disclosure.

FIG. 9 is a flowchart of operations for generative model distillation, in accordance with one or more embodiments of this disclosure.

DETAILED DESCRIPTION

Figure 1:
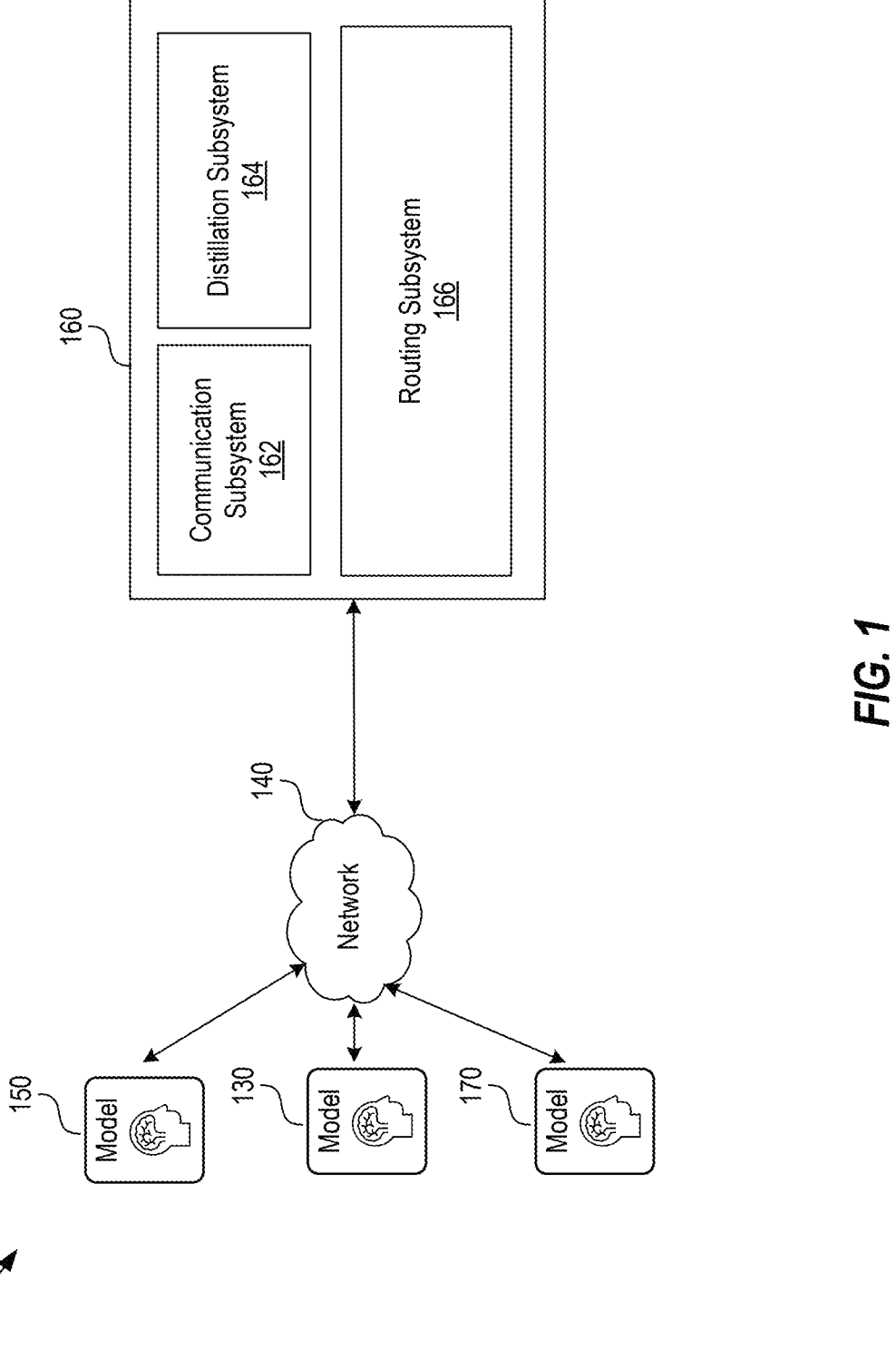
FIG. 1 shows an illustrative system for generative model distillation, in accordance with one or more embodiments of this disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein. Furthermore, in the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement.

Hierarchical model distillation systems may address computational challenges associated with deploying large language models across diverse hardware environments. These systems may create multiple specialized generative models from a single large language model through progressive reduction techniques. The approach may enable organizations to maintain model capabilities while adapting to varying computational constraints across different deployment scenarios.

Large language models may demonstrate substantial capabilities but may require significant computational resources for operation. Traditional deployment approaches may involve using a single model size across all use cases or manually creating separate models for different scenarios. These approaches may result in suboptimal resource utilization and may fail to balance performance requirements with available computational capacity.

A hierarchical model distillation system may systematically generate multiple specialized models from a foundation model through knowledge transfer processes. The system may implement progressive distillation techniques that may preserve model knowledge while reducing computational requirements. Each specialized model in the hierarchy may target specific complexity levels and may be optimized for particular deployment environments.

The distillation process may involve multiple complementary techniques including knowledge distillation, structured pruning, and quantization. Knowledge distillation may transfer learned representations from a large teacher model to smaller student models through soft target training and attention alignment. Structured pruning may remove redundant model components while maintaining performance characteristics. Quantization may reduce numerical precision of model parameters to decrease memory requirements and computational overhead.

Domain-specific specialization may further enhance model efficiency by tailoring each specialized model for particular use cases. The specialization process may involve vocabulary reduction, task-specific fine-tuning, and response optimization for targeted applications. This approach may enable models to achieve higher performance within specific domains while maintaining reduced computational footprints.

The resulting hierarchy of specialized models may span from ultra-lightweight models suitable for edge devices to more capable models for cloud-based deployments. Each model tier may handle different complexity levels of requests while maintaining appropriate response times and accuracy levels. The system may enable organizations to deploy artificial intelligence capabilities across diverse hardware environments without compromising performance or efficiency requirements.

Referring to FIG. 1, an environment 100 may provide a framework for implementing hierarchical model distillation across distributed computing resources. Environment 100 may facilitate the creation and deployment of specialized generative models through coordinated processing across multiple system components. Environment 100 may include multiple generative models that may serve different roles within the hierarchical distillation process. A generative model 130 may function as a foundation model containing comprehensive knowledge representations across multiple domains. Generative model 130 may serve as a teacher model for knowledge transfer processes and may provide source material for generating specialized derivative models. For example, generative model 130 may contain banking and financial domain knowledge that may be distilled into smaller, specialized models for specific use cases.

A generative model 150 may represent an intermediate model within the distillation hierarchy. Generative model 150 may receive knowledge from the generative model 130 through distillation processes and may serve as a source for further specialization. Generative model 150 may be optimized for particular complexity levels and may handle requests that may require moderate computational resources. For instance, generative model 150 may process transaction-related queries that may involve multiple processing steps but may not require the full capabilities of the foundation model.

A generative model 170 may represent a highly specialized model within the hierarchy. Generative model 170 may be optimized for specific deployment environments such as edge devices or mobile platforms. Generative model 170 may handle simple queries with minimal computational overhead while maintaining acceptable accuracy levels. Furthermore, generative model 170 may implement aggressive optimization techniques including quantization and pruning to achieve reduced resource requirements.

A network 140 may provide communication infrastructure connecting the various system components within the environment 100. Network 140 may facilitate data exchange between generative models and may enable coordination of distillation processes across distributed computing resources. In some implementations, network 140 may support various communication protocols and may handle different types of data transfers including model parameters, training data, and inference requests. For example, network 140 may enable the transfer of knowledge representations from generative model 130 to other models during distillation processes.

A model generation system 160 may coordinate the creation and management of specialized generative models within environment 100. Model generation system 160 may implement distillation workflows that may transform large foundation models into hierarchies of specialized models. Model generation system 160 may manage the entire lifecycle of model creation from initial distillation through deployment optimization, and may include multiple subsystems that may handle different aspects of the model generation process. Model generation system 160 may include other modules, subsystems, components, etc. (e.g., as described in FIGS. 2-9).

A communication subsystem 162 within the model generation system 160 may manage data exchange between system components. Communication subsystem 162 may coordinate the transfer of model parameters, training data, and configuration information across network 140. Communication subsystem 162 may implement protocols for secure data transmission and may handle authentication and authorization for model access. For example, communication subsystem 162 may manage the transfer of distilled model parameters from cloud-based processing systems to edge deployment environments.

A distillation subsystem 164 may implement the technical processes for creating specialized models from foundation models. Distillation subsystem 164 may execute knowledge distillation algorithms that may transfer learned representations from teacher models to student models. Furthermore, distillation subsystem 164 may implement structured pruning techniques that may remove redundant model components while preserving performance characteristics. Distillation subsystem 164 may also perform quantization processes that may reduce numerical precision of model parameters to decrease computational requirements.

A routing subsystem 166 may manage the deployment and utilization of specialized models across different environments. Routing subsystem 166 may analyze incoming requests and may determine appropriate model assignments based on complexity requirements and available computational resources. Furthermore, routing subsystem 166 may implement load balancing algorithms that may distribute processing across multiple model instances. For example, routing subsystem 166 may route simple informational queries to lightweight edge models while directing complex analytical tasks to more capable cloud-based models.

Model generation system 160 may be implemented using computing system components that may provide the computational resources for model distillation and management processes. The computing system may include one or more processors that may execute instructions for implementing distillation algorithms, pruning techniques, and quantization processes. The computing system may include memory components that may store model parameters, training data, and intermediate processing results during distillation workflows.

The computing system may include non-transitory computer-readable media that may store instructions for implementing the various functions of model generation system 160. The computer-readable media may contain program code that may cause processors to execute distillation processes, manage model hierarchies, and coordinate deployment activities. The instructions may implement algorithms for knowledge transfer, structured pruning, quantization, and intelligent routing across the specialized model hierarchy.

Figure 2:
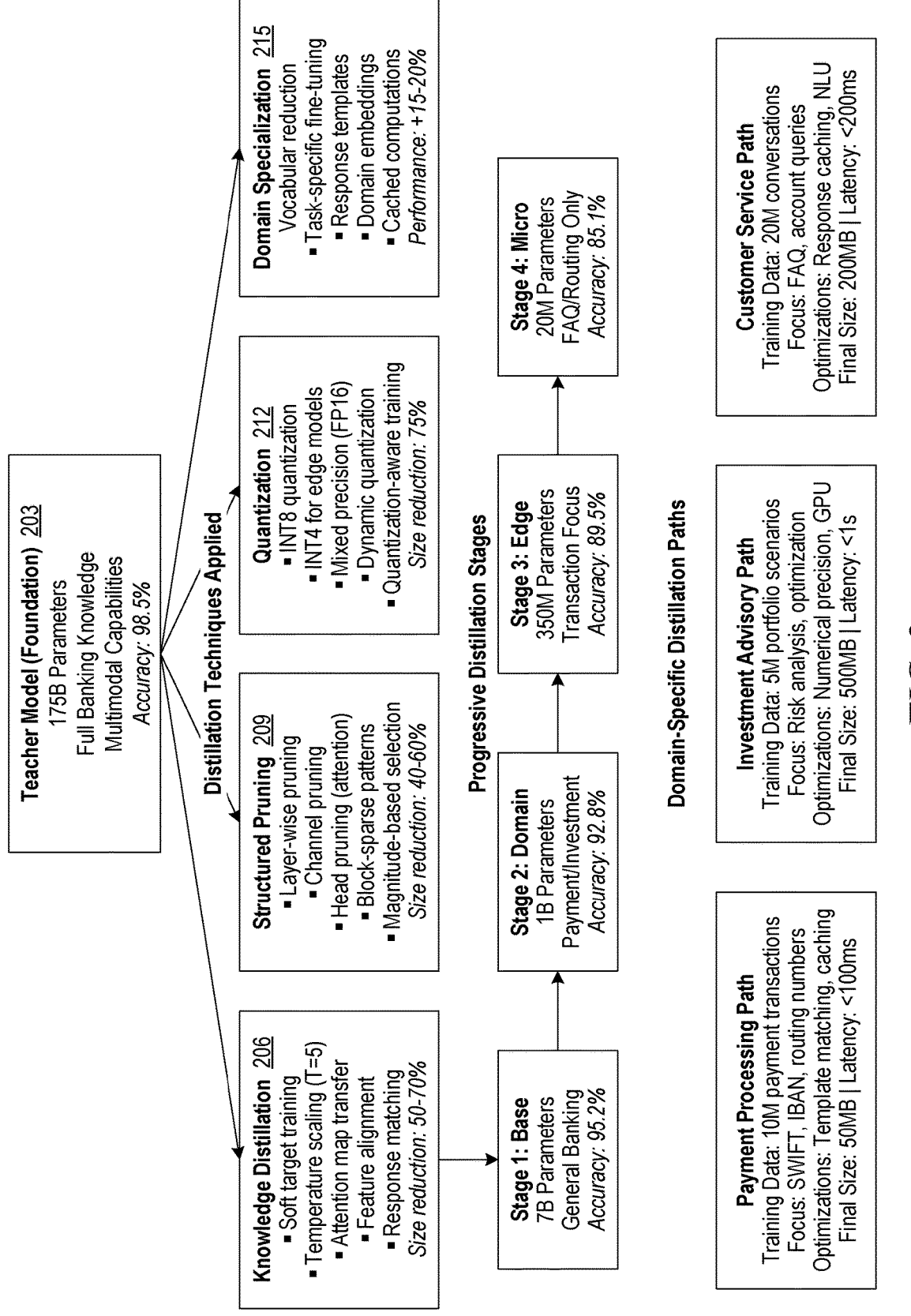
FIG. 2 illustrates a hierarchical multi-level model distillation system architecture, in accordance with one or more embodiments of this disclosure.

Referring to FIG. 2, model generation system 160 may determine a hierarchy for generating a plurality of specialized generative models from a large language model through systematic analysis of computational requirements and domain specifications. Distillation subsystem 164 may establish hierarchical structures that may organize specialized models according to different categories and complexity levels. Each specialized generative model in the hierarchy may be associated with a different complexity level of a plurality of complexity levels for performing tasks with different complexities. For example, distillation subsystem 164 may analyze computational constraints of target deployment environments and may create corresponding model tiers that may match available processing capabilities.

In some implementations, model generation system 160 may receive a request to generate the plurality of specialized generative models through communication subsystem 162. The request may include a natural language concept that may specify desired model characteristics or deployment requirements. Communication subsystem 162 may process natural language inputs such as "create banking models for mobile deployment" or "generate investment advisory models for branch terminals" and may extract relevant parameters from these requests. For instance, communication subsystem 162 may parse natural language requests to identify target domains, computational constraints, and performance requirements.

Distillation subsystem 164 may generate, using the large language model, a category associated with the natural language concept received in the request. For example, distillation subsystem 164 may analyze the natural language concept and may classify the request into appropriate domain categories such as payment processing, investment advisory, general banking, or customer service. The category generation process may involve semantic analysis of the natural language concept and may map the concept to predefined domain classifications. For example, a request mentioning "portfolio optimization" may be classified into an investment domain category, while a request referencing "transaction processing" may be assigned to a payment domain category.

Distillation subsystem 164 may determine the hierarchy based on the generated category through structured analysis of domain requirements and computational constraints. The hierarchy determination process may involve creating multiple complexity levels within each category and may establish relationships between different specialized models. Distillation subsystem 164 may organize the hierarchy to enable progressive complexity handling from simple queries to sophisticated analytical tasks. For instance, distillation subsystem 164 may create a payment domain hierarchy that may include micro models for basic lookups, edge models for transaction processing, and cloud models for complex payment analytics.

As shown in FIG. 2, a foundation model 203 may serve as the source for all specialized generative models within the hierarchy. The foundation model 203 may include one hundred and seventy five billion or more parameters containing comprehensive banking and financial knowledge trained on vast corpora of financial data, regulations, and domain expertise. Foundation model 203 may provide the base knowledge representations that may be transferred to smaller specialized models through distillation processes. Foundation model 203 may contain multi-modal capabilities and may achieve high accuracy levels across diverse financial and banking tasks, serving as the teacher model for knowledge transfer operations.

Distillation subsystem 164 may implement four domain-specific distillation paths that may create specialized models for different banking and financial applications. The payment domain path may generate models optimized for transaction processing, SWIFT code lookups, and payment validation tasks. The investment domain path may create models specialized for portfolio analysis, risk assessment, and investment advisory functions. The general banking path may produce models for routine banking operations, account management, and customer service interactions. The micro models path may generate ultra-lightweight models for basic FAQ responses and query routing functions.

The hierarchy may include a deployment tier structure that may organize specialized models into five distinct tiers based on computational complexity and resource requirements. Tier 0 may include micro models with minimal computational requirements suitable for basic informational queries. Tier 1 may contain edge models optimized for transactional operations on resource-constrained devices. Tier 2 may include branch models designed for complex banking services requiring moderate computational resources. Tier 3 may contain cloud models capable of sophisticated analysis tasks with substantial processing capabilities. Tier 4 may include specialist models for quantitative finance applications requiring advanced computational resources and specialized domain knowledge.

Model generation system 160 may receive a natural language query that may include the category information for hierarchy determination. Communication subsystem 162 may process natural language queries such as "create small payment models for mobile devices" or "generate comprehensive investment models for cloud deployment" and may extract category-specific parameters. The natural language query processing may involve parsing linguistic structures and may identify domain-specific terminology that may indicate desired model characteristics.

Distillation subsystem 164 may determine, based on the natural language query, that the category may include one or more specification parameters for model generation. The category may include a model size parameter indicating a size parameter for one or more of the plurality of specialized generative models, such as parameter counts ranging from millions to billions. The category may include a domain parameter indicating one or more topics for training the plurality of specialized generative models, such as payment processing, investment advisory, or customer service domains. The category may include a model location parameter for one or more of the plurality of specialized generative models, specifying deployment environments such as edge devices, branch servers, or cloud infrastructure. For example, a natural language query requesting "lightweight banking models for mobile apps" may result in category parameters specifying small model sizes, general banking domains, and edge device locations.

The hierarchical structure may be designed for conversational AI applications in regulated industries such as banking and financial services. Distillation subsystem 164 may incorporate compliance and security considerations into the hierarchy determination process and may ensure that specialized models may maintain regulatory requirements across different deployment tiers. The hierarchy may enable organizations to deploy AI capabilities while adhering to financial industry regulations and may provide appropriate security measures for sensitive financial data processing.

Distillation subsystem 164 may train, using the large language model and based on the category, the plurality of specialized generative models through systematic knowledge transfer processes. The training process may enable each specialized generative model to learn domain-specific representations from foundation model 203 while maintaining computational efficiency appropriate for the target deployment environment. The plurality of specialized generative models may be trained to provide responses to requests associated with the category through exposure to category-specific training data and response patterns.

Distillation subsystem 164 may generate, based on the category, a plurality of requests for the large language model to obtain a plurality of responses from the large language model during the training preparation phase. Each request in the plurality of requests may be related to the category and may cover diverse scenarios within the specified domain. For example, when training payment domain models, distillation subsystem 164 may generate requests such as "What is the SWIFT code for Bank of America?", "Process a wire transfer of $5,000 to account ending in 4567", and "Validate this IBAN: GB82 WEST 1234 5698 7654 32". The request generation process may ensure comprehensive coverage of category-specific use cases and may include varying complexity levels to support different model tiers within the hierarchy.

Distillation subsystem 164 may obtain the plurality of responses from foundation model 203 by processing each generated request through the large language model. Foundation model 203 may generate detailed, accurate responses that may serve as training targets for the specialized models. These responses may contain the full knowledge and reasoning capabilities of foundation model 203 and may provide rich learning signals for the distillation process. For instance, a response to a portfolio optimization request may include detailed analysis, risk calculations, and specific recommendations that may be used to train investment domain models.

Distillation subsystem 164 may input the plurality of requests and the plurality of responses into a corresponding training routine of each specialized generative model of the plurality of specialized generative models. Each training routine may train each specialized generative model using the plurality of requests and the plurality of responses through supervised learning processes that may align the specialized model outputs with the foundation model responses. The training routines may be customized for each model tier and may incorporate different optimization strategies based on the target computational constraints and performance requirements. The training may include access to various data stores that stores information required to respond to various requests. For example, the training routine may enable access to various Retrieval-Augmented Generation (RAG) architectures and/or knowledge graphs required for responding to requests.

A knowledge distillation module 206 within distillation subsystem 164 may implement advanced techniques for transferring knowledge from foundation model 203 to the specialized generative models. Knowledge distillation module 206 may employ soft target training with temperature scaling to facilitate knowledge transfer between models of different sizes. The temperature scaling parameter may be set to T=5, which may soften the probability distributions from foundation model 203 and may provide more informative training signals for the specialized models. The soft target training process may enable smaller models to learn from the nuanced probability distributions of foundation model 203 rather than just the hard classification decisions.

Knowledge distillation module 206 may implement alternative temperature scaling configurations to achieve different probability distribution characteristics during the knowledge transfer process. In some implementations, lower temperature values such as T=2 or T=3 may be employed to create sharper probability distributions that may emphasize the most confident predictions from foundation model 203. These lower temperature settings may result in more deterministic knowledge transfer and may be particularly suitable for specialized models that require high precision in specific domains such as regulatory compliance or risk assessment. Conversely, higher temperature values such as T=7 or T=10 may be utilized to create smoother probability distributions that may preserve more of the uncertainty and alternative reasoning paths from foundation model 203. The higher temperature settings may enable specialized models to maintain broader response capabilities and may be beneficial for models deployed in environments where creative problem-solving or handling of edge cases may be required. The temperature parameter may be dynamically adjusted during different phases of the distillation process or may be customized for different model tiers within the hierarchy based on their intended deployment scenarios and performance requirements.

Knowledge distillation module 206 may implement attention map alignment techniques that may transfer attention patterns from foundation model 203 to the specialized generative models. The attention map alignment process may ensure that specialized models may focus on similar input regions as foundation model 203 when processing requests. This alignment may preserve the reasoning patterns of foundation model 203 within the constraints of the smaller specialized architectures. For example, when processing a complex financial query, the specialized model may learn to attend to the same relevant portions of the input as foundation model 203.

Feature matching at intermediate layers may be implemented by knowledge distillation module 206 to align internal representations between the foundation model 203 and specialized models. The feature matching process may involve comparing activations at corresponding layers and may minimize differences between teacher and student model representations. This technique may ensure that specialized models may develop similar internal knowledge structures as foundation model 203, albeit in a more compact form. The intermediate layer alignment may preserve hierarchical feature learning patterns that may be important for maintaining model performance across different complexity levels.

Knowledge distillation module 206 may implement response distribution matching to ensure that specialized models may produce similar output distributions as foundation model 203 for category-specific requests. The response distribution matching process may involve comparing the full probability distributions over possible responses rather than just the most likely outputs. This approach may capture the uncertainty and confidence patterns of foundation model 203 and may transfer these characteristics to the specialized models. The distribution matching may enable specialized models to maintain appropriate confidence levels and may preserve the nuanced response characteristics of foundation model 203 within their respective domains.

Distillation subsystem 164 may prune, based on a corresponding associated complexity level, each specialized generative model of the plurality of specialized generative models through systematic removal of redundant model components. The pruning process may reduce computational requirements while preserving performance characteristics appropriate for each model's target deployment environment. Each specialized generative model, when pruned, may be enabled to respond to different requests of different complexity based on the corresponding associated complexity level. For example, a specialized model designated for edge deployment may undergo aggressive pruning to achieve minimal computational overhead while maintaining capability to handle simple transactional queries, whereas a specialized model intended for cloud deployment may undergo selective pruning that may preserve more complex reasoning capabilities.

The complexity levels within the hierarchical model distillation system may be organized into distinct tiers that may correspond to different computational capabilities and deployment scenarios. Tier 0 complexity levels may encompass micro-models designed for basic informational queries such as account balance lookups, SWIFT code retrievals, or simple FAQ responses that may require minimal processing power and may operate with parameter counts in the range of ten to fifty million. Tier 1 complexity levels may include edge models capable of handling transactional operations such as payment processing, basic fraud detection, or customer authentication tasks that may involve moderate computational requirements with parameter counts ranging from fifty to two hundred million. Tier 2 complexity levels may comprise branch models designed for sophisticated banking services including loan calculations, investment recommendations, or multi-step transaction analysis that may require substantial processing capabilities with parameter counts between two hundred million to two billion. Tier 3 complexity levels may encompass cloud models capable of advanced analytical tasks such as portfolio optimization, risk assessment modeling, or comprehensive financial planning that may utilize extensive computational resources with parameter counts exceeding two billion.

Pruning techniques may be applied systematically across these complexity levels to achieve appropriate model sizes while maintaining performance characteristics suitable for each deployment tier. For Tier 0 micro-models, aggressive pruning may remove up to ninety percent of the original model parameters by eliminating entire transformer blocks, reducing attention head counts from sixteen to four, and removing layers that may contribute minimally to basic query processing tasks. Tier 1 edge models may undergo moderate pruning that may remove sixty to seventy percent of parameters by selectively eliminating attention heads focused on complex reasoning patterns while preserving components relevant to transactional processing and security validation. Tier 2 branch models may experience selective pruning of forty to fifty percent of parameters by removing redundant intermediate layers and consolidating similar attention mechanisms while maintaining capabilities for multi-step reasoning and domain-specific analysis. Tier 3 cloud models may undergo minimal pruning of twenty to thirty percent of parameters by removing only the most redundant components and optimizing parameter precision while preserving the full range of analytical and reasoning capabilities required for complex financial tasks.

A structure pruning module 209 within distillation subsystem 164 may implement systematic techniques for removing unnecessary model components while maintaining performance characteristics. Structure pruning module 209 may analyze model architectures and may identify components that may contribute minimally to overall performance within specific domains or complexity levels. Furthermore, structure pruning module 209 may coordinate multiple pruning strategies that may target different aspects of model architecture including layers, channels, attention mechanisms, and parameter blocks.

In some implementations, structure pruning module 209 may determine, for each portion of a plurality of portions of a first specialized generative model of the plurality of specialized generative models, a matching metric through systematic analysis of component relevance to the target category. The matching metric may indicate how well a corresponding portion of the plurality of portions matches the category by measuring the contribution of each portion to category-specific performance. The plurality of portions may include one of neurons, attention heads, or layers within the specialized generative model architecture. For instance, when pruning a payment domain model, structure pruning module 209 may calculate matching metrics for individual attention heads by measuring their activation patterns when processing payment-related queries compared to their activation patterns for general queries.

Structure pruning module 209 may implement layer-specific pruning strategies that may target different types of neural network layers within the specialized generative models based on their architectural characteristics and functional roles. The layer-specific approach may involve applying distinct pruning techniques to transformer layers, embedding layers, and output layers according to their respective contributions to model performance within the target domain. For transformer layers, structure pruning module 209 may remove entire attention blocks or feedforward network components that may show minimal activation during domain-specific tasks, while embedding layers may undergo vocabulary pruning that may eliminate word embeddings irrelevant to the specialized domain such as removing creative writing vocabulary from financial models. Output layers may be pruned by reducing the dimensionality of classification heads or by eliminating output neurons corresponding to categories outside the target domain, such as removing non-financial classification outputs from banking-specific models. The layer-specific pruning process may enable more granular optimization of model architecture while maintaining the hierarchical relationships between different network components.

Structure pruning module 209 may implement neuron-level pruning techniques that may target individual neurons within the specialized generative models based on their contribution to domain-specific performance. The neuron pruning process may involve analyzing activation patterns of individual neurons during category-specific inference tasks and may identify neurons that may exhibit consistently low activation magnitudes or may contribute minimally to the overall model output for the target domain. Structure pruning module 209 may calculate importance scores for each neuron by measuring the impact of neuron removal on model performance within the specialized category, and may selectively remove or deactivate neurons that may fall below predetermined importance thresholds. For example, in a payment processing model, neurons that may show minimal activation when processing transaction-related queries may be candidates for removal, while neurons that may demonstrate strong activation patterns for payment validation tasks may be preserved. The neuron-level pruning may enable fine-grained optimization of model architecture and may result in more efficient neural network configurations that may require reduced computational resources during inference while maintaining acceptable accuracy levels for domain-specific tasks.

Structure pruning module 209 may calculate matching metrics through multiple evaluation approaches that may assess component importance within the target domain. The matching metric calculation may involve measuring activation magnitudes during category-specific inference tasks and may compare these magnitudes to baseline activation levels. Structure pruning module 209 may also compute gradient-based importance scores that may indicate how much each portion contributes to loss reduction during category-specific training. Additionally, the matching metric may incorporate correlation analysis between portion outputs and desired category-specific responses to identify components that may be most relevant for domain performance.

Structure pruning module 209 may prune one or more portions of the first specialized generative model where the matching metric does not meet a match threshold through systematic component removal. The match threshold may be established based on the target complexity level and may vary across different model tiers within the hierarchy. For example, edge models may employ lower match thresholds that may result in more aggressive pruning, while cloud models may use higher thresholds that may preserve more model components. The pruning process may remove portions with matching metrics below the threshold while maintaining model functionality for category-specific tasks.

In some implementations, structure pruning module 209 may determine, for a first specialized generative model of the plurality of specialized generative models, a plurality of tasks that the first specialized generative model may be enabled to complete through analysis of deployment requirements and domain specifications. The plurality of tasks may be defined based on the target complexity level and may encompass the range of requests that the specialized model may be expected to handle in its deployment environment. For instance, a payment domain edge model may be designed to complete tasks including SWIFT code lookups, basic transaction validation, and payment status inquiries, while excluding more complex tasks such as fraud analysis or regulatory compliance checking.

Structure pruning module 209 may identify one or more portions of a plurality of portions of the first specialized generative model that may not be required for completing the plurality of tasks through systematic analysis of component utilization during task execution. The identification process may involve running the plurality of tasks through the specialized model and may monitor which portions contribute to successful task completion. Components that may show minimal activation or may contribute negligibly to task performance may be identified as candidates for removal. For example, attention heads that may focus on linguistic patterns irrelevant to payment processing may be identified as unnecessary for a payment domain model.

Structure pruning module 209 may prune the one or more portions of the first specialized generative model that may not be required for completing the plurality of tasks through systematic component removal processes. The pruning may involve removing identified unnecessary portions while maintaining model architecture integrity and may ensure that remaining components may continue to function effectively. In some implementations, the pruning process may include retraining or fine-tuning steps that may help the remaining model components adapt to the reduced architecture and may maintain performance levels for the specified tasks.

In some implementations, structure pruning module 209 may implement layer-wise pruning based on importance scores that may evaluate the contribution of entire layers to model performance within specific domains. The layer-wise pruning process may calculate importance scores for each layer by measuring performance degradation when individual layers are temporarily disabled or removed. Layers with low importance scores may be candidates for removal, particularly in deeper model architectures where redundancy may exist between similar layers. For example, in a transformer architecture adapted for simple query processing, some of the deeper transformer blocks may show minimal contribution to performance and may be removed to reduce computational overhead.

Furthermore, structure pruning module 209 may perform channel pruning in convolutional layers by identifying and removing channels that may contribute minimally to feature extraction within the target domain. Channel pruning may involve analyzing the magnitude and variance of channel outputs during domain-specific inference tasks and may remove channels with consistently low activation levels. The channel pruning process may be particularly relevant for models that may include convolutional components for processing structured financial data or may incorporate vision capabilities for document analysis. For instance, channels that may be specialized for detecting visual patterns irrelevant to financial documents may be pruned from models deployed for banking applications.

Additionally or alternatively, structure pruning module 209 may implement attention head pruning in transformer architectures by removing attention heads that may not contribute meaningfully to domain-specific performance. The attention head pruning process may analyze attention patterns during category-specific tasks and may identify heads that may show random or irrelevant attention distributions. Attention heads that may focus on linguistic patterns outside the target domain may be candidates for removal. For example, in a banking domain model, attention heads that may specialize in creative writing patterns may be pruned while preserving heads that may focus on financial terminology and numerical relationships.

In some implementations, structure pruning module 209 may create block-sparse patterns for efficient computation by organizing remaining model parameters into structured sparse configurations. Block-sparse patterns may group related parameters together and may eliminate entire parameter blocks rather than individual parameters, which may enable more efficient computation on modern hardware architectures. The block-sparse approach may maintain computational efficiency while preserving important parameter relationships within the specialized model. For instance, structure pruning module 209 may organize attention parameters into blocks and may remove entire attention blocks that may be unnecessary for the target domain while maintaining blocks that may be relevant for domain-specific processing.

Structure pruning module 209 may achieve progressive model size reduction from one hundred and seventy five billion parameters in foundation model 203 to twenty million parameters (or less) in highly specialized edge models while maintaining eighty five to ninety five percent accuracy depending on task complexity. The progressive reduction may be accomplished through multiple pruning stages that may gradually remove less important components while monitoring performance degradation. Early pruning stages may remove obviously redundant components with minimal performance impact, while later stages may make more selective decisions that may balance size reduction with accuracy preservation. The final pruned models may retain the most domain-relevant components and may achieve substantial size reductions while maintaining acceptable performance levels for their intended deployment scenarios.

The pruning process implemented by structure pruning module 209 may be coordinated with other optimization techniques within distillation subsystem 164 to achieve comprehensive model optimization. The pruning may be performed before or after quantization processes and may be combined with knowledge distillation techniques to maintain model performance throughout the optimization pipeline. Structure pruning module 209 may work in conjunction with knowledge distillation module 206 to ensure that pruned models may retain the learned knowledge from foundation model 203 while achieving the computational efficiency required for their target deployment environments.

In some implementations, distillation subsystem 164 may quantize, based on a corresponding accuracy level (e.g., a required accuracy level), each specialized generative model from a common precision factor to a corresponding precision factor through systematic reduction of numerical precision in model parameters. The quantization process may reduce memory requirements and computational overhead while maintaining acceptable performance levels for each specialized model's target deployment environment. A given precision factor may be associated with a corresponding complexity level of the plurality of complexity levels, enabling the system to balance computational efficiency with model capability requirements across different deployment tiers.

A quantization module 212 within distillation subsystem 164 may implement multiple quantization techniques tailored to different deployment scenarios and hardware constraints. Quantization module 212 may coordinate the conversion of model parameters from high-precision floating-point representations to lower-precision formats that may require reduced computational resources during inference operations. The quantization process may be customized for each specialized generative model based on the target deployment environment and may incorporate different precision levels to optimize performance across the model hierarchy.

Quantization module 212 may determine, for each specialized generative model of the plurality of specialized generative models using the corresponding associated complexity level, the corresponding precision factor through analysis of deployment requirements and accuracy constraints. Each corresponding precision factor may include a number of bits representing model parameters, where the model parameters may include weights and activations within the neural network architecture. For example, foundation model 203 may initially utilize thirty-two bit floating-point precision (FP32) as the common precision factor, while edge models may be quantized to eight-bit integer precision (INT8) and ultra-lightweight models may be reduced to four-bit integer precision (INT4) to achieve minimal computational overhead.

The precision factor determination process may involve evaluating the sensitivity of each specialized model to precision reduction within its target domain. Quantization module 212 may analyze how different precision levels may affect model accuracy for category-specific tasks and may select precision factors that may maintain acceptable performance thresholds. Models designated for complex analytical tasks may require higher precision factors to preserve numerical accuracy in calculations, while models handling simple informational queries may tolerate more aggressive precision reduction without significant performance degradation.

Quantization module 212 may implement INT8 quantization for general deployment scenarios where specialized models may require balanced performance and efficiency characteristics. The INT8 quantization process may convert thirty-two bit floating-point weights and activations to eight-bit integer representations, achieving approximately seventy-five percent reduction in memory requirements and computational overhead. INT8 quantization may be particularly suitable for branch server deployments and mid-tier cloud applications where moderate computational resources may be available but efficiency optimization may still be beneficial. The INT8 quantization may preserve sufficient numerical precision for most banking and financial applications while enabling deployment on standard CPU architectures without specialized hardware acceleration.

For extreme edge cases involving highly resource-constrained environments, quantization module 212 may implement INT4 quantization that may reduce model parameters to four-bit integer representations. The INT4 quantization may achieve substantial memory and computational savings by reducing parameter storage requirements by approximately eighty-seven percent compared to the original FP32 precision. INT4 quantization may be applied to micro-models designated for mobile device deployment, IoT applications, or embedded systems where computational resources may be severely limited. The aggressive precision reduction may require careful calibration to maintain acceptable accuracy levels, and quantization module 212 may implement specialized techniques such as asymmetric quantization ranges and learned quantization parameters to preserve model performance under extreme precision constraints.

Quantization module 212 may implement mixed precision FP16 quantization for GPU deployment scenarios where specialized hardware acceleration may be available. The mixed precision approach may utilize sixteen-bit floating-point representations (FP16) for most model parameters while maintaining higher precision (FP32) for components that may be sensitive to precision reduction, such as loss calculations or gradient computations during fine-tuning operations. Mixed precision FP16 quantization may enable specialized models to leverage GPU tensor cores and may achieve significant speedup in inference operations while maintaining numerical stability for complex financial calculations. The mixed precision strategy may be particularly beneficial for cloud-deployed models that may handle sophisticated analytical tasks requiring both computational efficiency and numerical accuracy.

Quantization module 212 may implement quantization-aware training techniques that may incorporate precision reduction effects during the model training process rather than applying quantization as a post-training optimization. The quantization-aware training may simulate the effects of reduced precision during forward and backward propagation, enabling the specialized models to adapt their learned representations to account for quantization artifacts. This approach may result in better performance preservation compared to post-training quantization methods and may enable more aggressive precision reduction while maintaining acceptable accuracy levels. Quantization-aware training may be particularly valuable for specialized models that may undergo significant precision reduction, such as edge models transitioning from FP32 to INT8 or micro-models being quantized to INT4 representations.

The quantization-aware training process may involve implementing fake quantization operations during training that may simulate the rounding and clipping effects of actual quantization without changing the underlying parameter precision. Quantization module 212 may insert quantization simulation nodes into the computational graph that may apply quantization operations during forward passes while maintaining full precision gradients during backward propagation. This approach may enable the specialized models to learn parameter values that may be robust to quantization effects and may minimize accuracy degradation when the models are deployed with actual reduced precision representations.

Quantization module 212 may update, for each specialized generative model, the common precision factor with the corresponding precision factor through systematic parameter conversion processes. The corresponding precision factor may be different for each specialized generative model of the plurality of specialized generative models, reflecting the diverse deployment requirements and computational constraints across the model hierarchy. For instance, a payment processing edge model may be updated from FP32 to INT8 precision, while a portfolio optimization cloud model may be updated to mixed precision FP16, and a basic query micro-model may be updated to INT4 precision.

The parameter conversion process may involve mapping floating-point parameter values to quantized representations using calibration datasets that may be representative of the target domain and deployment scenario. Quantization module 212 may analyze the distribution of parameter values and activations during inference on domain-specific data and may determine optimal quantization ranges and scaling factors for each specialized model. The calibration process may ensure that quantized parameters may preserve the most important numerical relationships within the specialized model while achieving the desired precision reduction.

Quantization module 212 may implement dynamic quantization techniques that may adapt quantization parameters based on input characteristics or computational context. Dynamic quantization may adjust quantization ranges and scaling factors during inference operations to optimize numerical precision for different types of queries or data patterns. This approach may enable specialized models to maintain higher effective precision for complex queries while achieving maximum efficiency for simple requests.

Dynamic quantization may be particularly beneficial for models that may handle diverse query types within their designated complexity level.

The quantization process may be coordinated with other optimization techniques implemented by distillation subsystem 164 to achieve comprehensive model optimization. Quantization module 212 may work in conjunction with structure pruning module 209 to ensure that quantization and pruning optimizations may complement each other and may not result in compounding accuracy degradation. The quantization may be applied after pruning operations to avoid quantizing parameters that may subsequently be removed, or the techniques may be applied iteratively with performance monitoring to achieve optimal balance between model size, computational efficiency, and accuracy preservation.

Quantization module 212 may implement specialized quantization strategies for different types of model parameters based on their functional roles within the neural network architecture. Weight parameters may undergo symmetric quantization with zero-point centering, while activation parameters may utilize asymmetric quantization to accommodate different value distributions. Bias parameters may be maintained at higher precision levels to preserve numerical accuracy in linear transformations, while embedding parameters may be aggressively quantized since they may represent discrete categorical relationships that may be less sensitive to precision reduction.

The quantization optimization may result in specialized models that may achieve substantial computational efficiency improvements while maintaining performance characteristics appropriate for their designated complexity levels and deployment environments. Quantized models may require significantly reduced memory bandwidth, storage capacity, and computational resources during inference operations, enabling deployment across diverse hardware platforms from mobile devices to cloud servers. The precision factor customization may ensure that each specialized model may achieve optimal balance between efficiency and accuracy for its intended use cases within the hierarchical model distillation system.

The quantization process may be adapted based on the specific requirements and constraints of different deployment environments, with each location presenting distinct challenges for balancing accuracy, size, and resource utilization. In edge computing scenarios, where computational resources, memory capacity, and power consumption are typically constrained, more aggressive quantization techniques may be employed to achieve the necessary model size reductions and inference speed improvements. Edge environments may necessitate the use of INT4 or INT8 quantization to meet strict latency requirements and memory limitations, even when this results in some accuracy degradation compared to higher precision representations. The resource constraints in edge deployments may require specialized models to prioritize computational efficiency over maximum accuracy, enabling real-time processing capabilities on devices with limited processing power and battery life.

Conversely, datacenter environments may provide abundant computational resources, memory capacity, and power availability, allowing for less aggressive quantization strategies that may preserve higher accuracy levels while still achieving meaningful performance benefits. Datacenter deployments may utilize mixed precision FP16 quantization or higher precision INT8 implementations that may maintain numerical stability for complex financial calculations and analytical tasks. The availability of specialized hardware acceleration such as GPU tensor cores in datacenter environments may enable the use of quantization techniques that may leverage hardware-specific optimizations while maintaining acceptable accuracy thresholds. The selection of quantization parameters in datacenter scenarios may prioritize model fidelity and computational precision when accuracy requirements are paramount and resource constraints are less restrictive, allowing for more sophisticated quantization-aware training processes and dynamic quantization adjustments based on query complexity.

A domain specialization module 215 within distillation subsystem 164 may implement advanced techniques for tailoring specialized generative models to specific use cases through systematic optimization of model components for targeted applications. Domain specialization module 215 may enhance model performance within designated domains by reducing computational overhead and improving response accuracy for category-specific tasks. The specialization process may involve multiple complementary approaches that may customize different aspects of model architecture and behavior to achieve optimal performance within constrained deployment environments.

Domain specialization module 215 may implement vocabulary reduction techniques that may limit model vocabularies to domain-relevant terms, thereby reducing computational requirements and improving processing efficiency for specialized applications. The vocabulary reduction process may analyze the frequency and relevance of different terms within the target domain and may eliminate vocabulary entries that may be unlikely to appear in domain-specific queries or responses. For example, a payment processing model may retain financial terminology, banking codes, and transaction-related vocabulary while removing terms related to creative writing, scientific research, or other domains outside the scope of payment operations. The vocabulary reduction may result in smaller embedding layers and may reduce the computational overhead associated with token processing during inference operations.

The vocabulary reduction process may involve statistical analysis of domain-specific corpora to identify terms that may appear frequently in target applications versus terms that may be irrelevant to the specialized use case. Domain specialization module 215 may calculate term frequency distributions across category-specific datasets and may establish relevance thresholds that may determine which vocabulary entries may be preserved in the specialized model. Terms that may fall below the relevance threshold may be removed from the model vocabulary, while terms that may demonstrate high frequency or importance within the domain may be retained and may potentially receive enhanced representation within the specialized model architecture.

Domain specialization module 215 may implement task-specific fine-tuning processes that may adapt specialized generative models to perform optimally on curated datasets representative of their intended deployment scenarios. The task-specific fine-tuning may involve continued training of the specialized models using datasets that may contain examples of queries and responses typical of the target domain and complexity level. For instance, an investment advisory model may undergo fine-tuning using datasets containing portfolio analysis requests, risk assessment queries, and investment recommendation scenarios that may be representative of the types of requests the model may encounter in production deployment.

The curated datasets used for task-specific fine-tuning may be assembled through systematic collection and filtering of domain-relevant examples that may cover the range of scenarios the specialized model may be expected to handle. Domain specialization module 215 may coordinate with communication subsystem 162 to gather representative examples from production systems, synthetic data generation processes, or expert-curated collections that may provide comprehensive coverage of domain-specific use cases. The curation process may ensure that training examples may reflect the complexity level appropriate for each specialized model and may include both common scenarios and edge cases that may be relevant to the target deployment environment.

Domain specialization module 215 may implement response template optimization techniques that may standardize and streamline response generation for common query patterns within each specialized domain. The response template optimization may involve identifying recurring response structures within the target domain and may create optimized templates that may enable more efficient response generation while maintaining consistency and accuracy. For example, a customer service model may utilize response templates for account balance inquiries, transaction status updates, and basic troubleshooting scenarios that may provide structured response formats while reducing computational overhead associated with generating responses from scratch.

The response template optimization process may analyze patterns in high-quality responses generated by foundation model 203 for domain-specific queries and may extract common structural elements that may be generalized into reusable templates. Domain specialization module 215 may identify response components such as greeting patterns, information presentation formats, and closing statements that may be consistent across similar query types within the domain. The extracted templates may be integrated into the specialized models as optimized response generation pathways that may reduce inference time and may improve response consistency for frequently encountered query patterns.

Domain specialization module 215 may implement cached computation techniques that may pre-compute and store responses for frequent queries within each specialized domain, thereby reducing inference latency and computational requirements for common requests. The cached computation approach may identify queries that may appear repeatedly within the target domain and may pre-generate high-quality responses that may be retrieved directly without requiring full model inference. For instance, a payment domain model may cache responses for common SWIFT code lookups, standard transaction fee inquiries, or frequently requested banking information that may be accessed instantly when matching queries are received.

The cached computation system may maintain dynamic cache structures that may be updated based on query frequency patterns and may adapt to changing usage patterns within each specialized domain. Domain specialization module 215 may monitor query patterns during production deployment and may identify new candidates for caching based on frequency thresholds and response consistency requirements. The cache management process may balance storage requirements with performance benefits and may implement cache eviction policies that may remove less frequently accessed entries to maintain optimal cache performance and storage utilization.

Domain specialization module 215 may coordinate the integration of vocabulary reduction, task-specific fine-tuning, response template optimization, and cached computation techniques to achieve comprehensive domain specialization that may enhance model performance across multiple dimensions simultaneously. The integration process may ensure that different specialization techniques may complement each other and may not introduce conflicting optimizations that may degrade overall model performance. For example, vocabulary reduction may be coordinated with response template optimization to ensure that templates may utilize only terms that may be retained in the reduced vocabulary, while cached computation may be aligned with task-specific fine-tuning to ensure that cached responses may reflect the specialized model's learned behavior patterns.

The domain specialization process may result in performance improvements of fifteen to twenty percent compared to non-specialized models of similar size, enabling specialized models to achieve higher accuracy and efficiency within their target domains while maintaining reduced computational footprints. The performance enhancement may be measured across multiple metrics including response accuracy, inference latency, and resource utilization, with specialized models demonstrating superior performance characteristics compared to general-purpose models when evaluated on domain-specific tasks. The specialization benefits may be particularly pronounced for models deployed in resource-constrained environments where computational efficiency may be paramount for achieving acceptable performance levels.

Domain specialization module 215 may implement domain-specific embedding optimizations that may enhance the representation of concepts and relationships that may be particularly relevant within each specialized domain. The embedding optimization process may adjust the learned representations of domain-relevant terms to improve semantic understanding and may enhance the model's ability to process domain-specific queries accurately. For example, financial domain models may receive enhanced embeddings for numerical concepts, currency relationships, and regulatory terminology that may improve the model's understanding of financial contexts and may enable more accurate processing of banking and investment queries.

The specialization techniques implemented by domain specialization module 215 may be customized based on the specific characteristics and requirements of different domains within the hierarchical model distillation system. Payment processing domains may emphasize transaction validation patterns and regulatory compliance templates, while investment advisory domains may focus on risk analysis frameworks and portfolio optimization structures. Customer service domains may prioritize conversational patterns and problem resolution workflows, while general banking domains may balance multiple functional areas to provide comprehensive coverage of routine banking operations. The domain-specific customization may ensure that each specialized model may achieve optimal performance within its designated area of expertise while maintaining appropriate computational efficiency for its target deployment environment.

Figure 3:
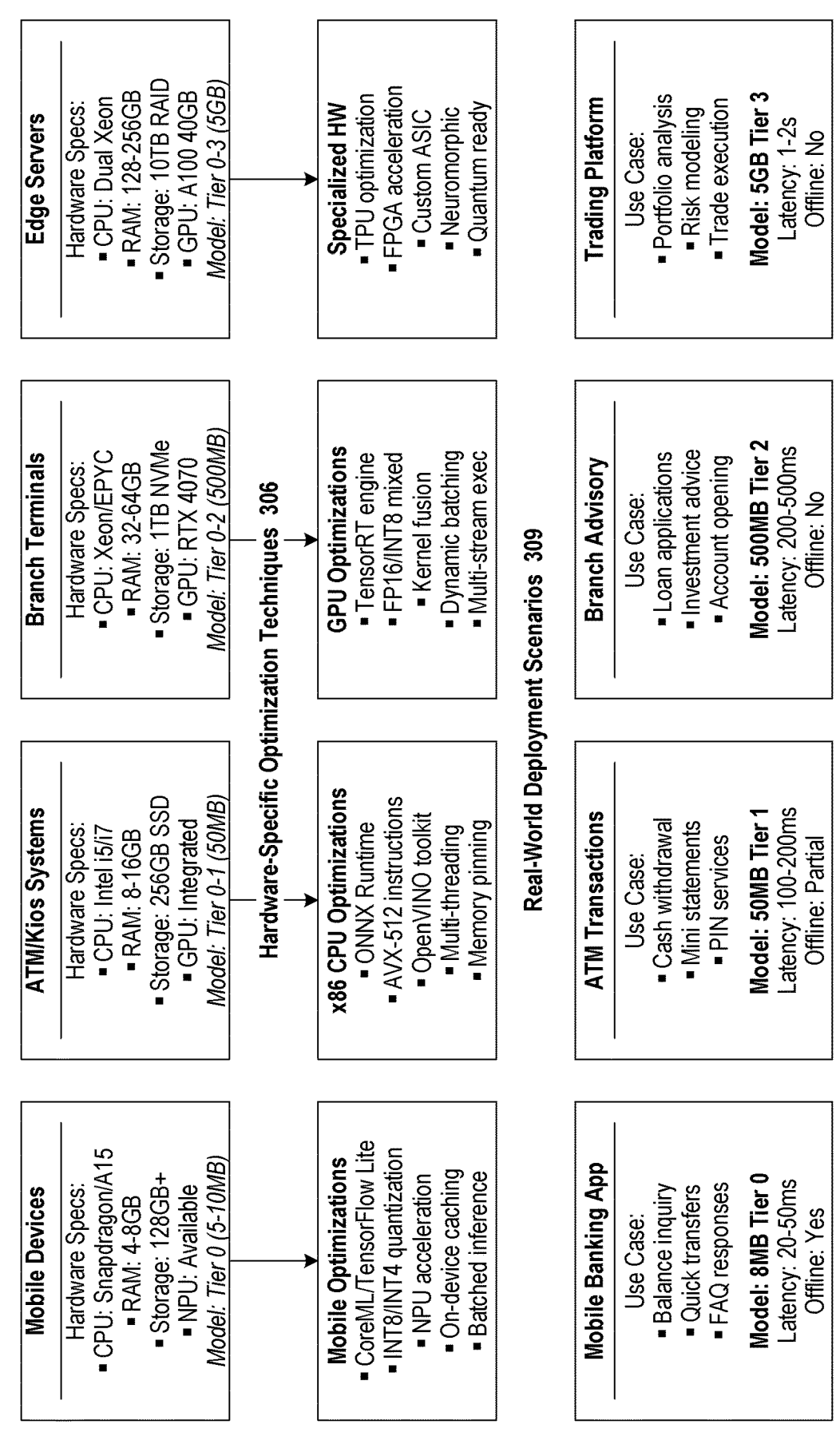
FIG. 3 illustrates edge deployment architecture, in accordance with one or more embodiments of this disclosure.

Referring to FIG. 3, model generation system 160 may determine, based on the corresponding complexity level of the plurality of complexity levels, a corresponding location of a plurality of locations for each pruned specialized generative model through systematic analysis of deployment requirements and hardware capabilities. The location determination process may involve matching the computational requirements of each specialized model with the available resources at different deployment environments to ensure optimal performance and resource utilization. Model generation system 160 may evaluate factors including processing power, memory capacity, storage availability, and network connectivity when determining appropriate deployment locations for each specialized generative model within the hierarchical structure.

A deployment tier structure 303 may organize hardware deployment configurations across multiple tiers that may correspond to different computational capabilities and deployment scenarios. Deployment tier structure 303 may include mobile device tiers with ARM or x86 processors, four to eight gigabytes of RAM, and neural processing unit acceleration capabilities suitable for ultra-lightweight models. ATM and kiosk tiers within deployment tier structure 303 may feature Intel i5 or i7 processors, eight to sixteen gigabytes of RAM, and integrated graphics processing capabilities that may support edge models with moderate computational requirements. Branch terminal tiers may include Xeon or EPYC processors, thirty-two to sixty-four gigabytes of RAM, and RTX 4070 GPU acceleration that may enable deployment of more sophisticated specialized models. Edge server tiers within deployment tier structure 303 may provide dual Xeon processors, one hundred twenty-eight to two hundred fifty-six gigabytes of RAM, and A100 GPU acceleration for complex analytical models requiring substantial computational resources.

Model generation system 160 may analyze the complexity levels of pruned specialized generative models and may match these complexity requirements with the computational capabilities provided by different tiers within deployment tier structure 303. Tier 0 micro-models with minimal computational requirements may be assigned to mobile device deployments where processing power and memory may be limited but sufficient for basic informational queries. Tier 1 edge models may be allocated to ATM and kiosk environments that may provide moderate computational resources suitable for transactional operations and customer service interactions. Tier 2 branch models may be deployed to branch terminal environments that may offer enhanced processing capabilities for complex banking services and multi-step analytical tasks. Tier 3 and Tier 4 specialist models may be assigned to edge server deployments that may provide substantial computational resources for sophisticated financial analysis and quantitative modeling tasks.

An optimization technique layer 306 may implement hardware-specific optimization strategies that may enhance model performance across different deployment environments within deployment tier structure 303. Optimization technique layer 306 may coordinate multiple optimization approaches that may be tailored to the specific characteristics and capabilities of each hardware tier to achieve optimal inference performance and resource utilization. The optimization strategies may be applied during the model preparation phase before transmission to deployment locations and may ensure that specialized models may operate efficiently within their target hardware environments.

For mobile device deployments, optimization technique layer 306 may implement CoreML and TensorFlow Lite optimizations that may enable specialized models to leverage mobile-specific hardware acceleration and may achieve efficient inference on ARM and A15 processors. The mobile optimization process may include INT8 and INT4 quantization techniques that may reduce memory requirements and may enable models to operate within the constrained memory environments typical of mobile devices. Neural processing unit acceleration may be utilized through optimization technique layer 306 to offload inference computations from the main processor and may achieve improved performance and battery efficiency for mobile deployments.

Optimization technique layer 306 may implement ONNX Runtime optimizations with AVX-512 instruction support for x86 CPU deployments including ATM, kiosk, and branch terminal environments. The x86 optimization process may leverage advanced vector processing capabilities and may utilize OpenVINO optimizations that may enhance inference performance on Intel processor architectures. The CPU-specific optimizations may include memory layout optimizations, instruction-level parallelism enhancements, and cache utilization improvements that may maximize computational efficiency within x86 deployment environments.

For GPU-accelerated deployments including branch terminals and edge servers, optimization technique layer 306 may implement TensorRT optimizations with FP16 and INT8 mixed precision support that may leverage GPU tensor cores for enhanced inference performance. The GPU optimization process may include kernel fusion techniques that may combine multiple computational operations and may reduce memory bandwidth requirements during inference operations. Dynamic batching optimizations may be implemented through optimization technique layer 306 to enable efficient processing of multiple concurrent requests and may maximize GPU utilization across different query loads.

Optimization technique layer 306 may implement specialized hardware acceleration techniques including TPU optimization for tensor processing units and FPGA acceleration for field-programmable gate arrays when such hardware may be available within the deployment environment. Custom ASIC optimizations may be applied for application-specific integrated circuits that may provide dedicated acceleration for particular model architectures or computational patterns. The specialized hardware optimizations may enable deployment of more sophisticated models within resource-constrained environments by leveraging hardware-specific acceleration capabilities that may not be available through general-purpose processors.

A deployment scenario layer 309 may define real-world implementation cases that may specify the operational requirements and performance targets for specialized models across different deployment environments. Deployment scenario layer 309 may include mobile banking applications that may require ultra-low latency responses and may operate with limited network connectivity, necessitating deployment of highly optimized micro-models with offline processing capabilities. ATM transaction scenarios within deployment scenario layer 309 may specify requirements for secure transaction processing, customer authentication, and basic account services that may be handled by edge models with moderate computational capabilities.

Branch advisory service scenarios within deployment scenario layer 309 may define requirements for complex customer interactions, loan calculations, and investment consultations that may require deployment of more sophisticated branch models with enhanced analytical capabilities. Trading platform scenarios may specify high-performance requirements for real-time market analysis, portfolio optimization, and risk assessment tasks that may necessitate deployment of specialist models with substantial computational resources and low-latency processing capabilities.

Deployment scenario layer 309 may specify coverage percentage targets that may guide the selection of appropriate model tiers for different deployment environments. Edge device deployments may target coverage of eighty percent of queries through deployment of Tier 0 and Tier 1 models that may handle the majority of routine informational and transactional requests with minimal computational overhead. The eighty percent coverage target may ensure that most common queries may be processed locally without requiring network connectivity or cloud-based processing, thereby providing responsive service even in environments with limited connectivity.

Branch server deployments may target coverage of ninety-five percent of queries through deployment of Tier 0, Tier 1, and Tier 2 models that may handle comprehensive banking services including complex analytical tasks and multi-step customer interactions. The ninety-five percent coverage target may ensure that branch environments may provide full-service banking capabilities with minimal reliance on cloud-based processing, enabling branches to maintain operational continuity even during network disruptions or connectivity issues.

Model generation system 160 may coordinate the location determination process by analyzing the computational requirements of each pruned specialized generative model and may match these requirements with the capabilities provided by different deployment environments within deployment tier structure 303. The matching process may consider factors including model parameter counts, memory requirements, inference latency targets, and accuracy preservation needs when determining optimal deployment locations. For example, a payment processing model with fifty million parameters and INT8 quantization may be determined suitable for mobile device deployment, while an investment analysis model with two billion parameters and mixed precision requirements may be assigned to edge server deployment.

The location determination process may incorporate dynamic considerations including current resource utilization, network connectivity status, and query load patterns when making deployment decisions. Model generation system 160 may monitor deployment environments and may adjust model assignments based on changing operational conditions or performance requirements. Load balancing considerations may influence location determination to ensure that computational resources may be utilized efficiently across different deployment tiers and may prevent resource bottlenecks that may degrade system performance.

Model generation system 160 may transmit one or more specialized generative models to the corresponding location through communication subsystem 162 and network 140. The transmission process may involve packaging optimized models with their associated configuration parameters, optimization settings, and deployment-specific adaptations that may enable immediate operation within the target environment. Communication subsystem 162 may coordinate secure transmission protocols that may protect model parameters during transfer and may ensure data integrity throughout the deployment process.

The model transmission process may include verification procedures that may confirm successful deployment and may validate model functionality within the target environment before activating the specialized models for production use. Communication subsystem 162 may implement checksums, digital signatures, and other integrity verification mechanisms that may ensure transmitted models may match the intended configurations and may operate correctly within their designated deployment locations. Rollback procedures may be implemented to enable rapid recovery in cases where model deployment may encounter issues or may not meet performance expectations within the target environment.

Model generation system 160 may implement staged deployment procedures that may gradually introduce specialized models to production environments and may monitor performance characteristics during initial deployment phases. The staged deployment approach may enable identification and resolution of deployment issues before full-scale activation and may ensure that specialized models may achieve expected performance levels within their target environments. Performance monitoring during deployment may provide feedback that may inform future location determination decisions and may enable continuous optimization of the deployment strategy across the hierarchical model distillation system.

Figure 5:
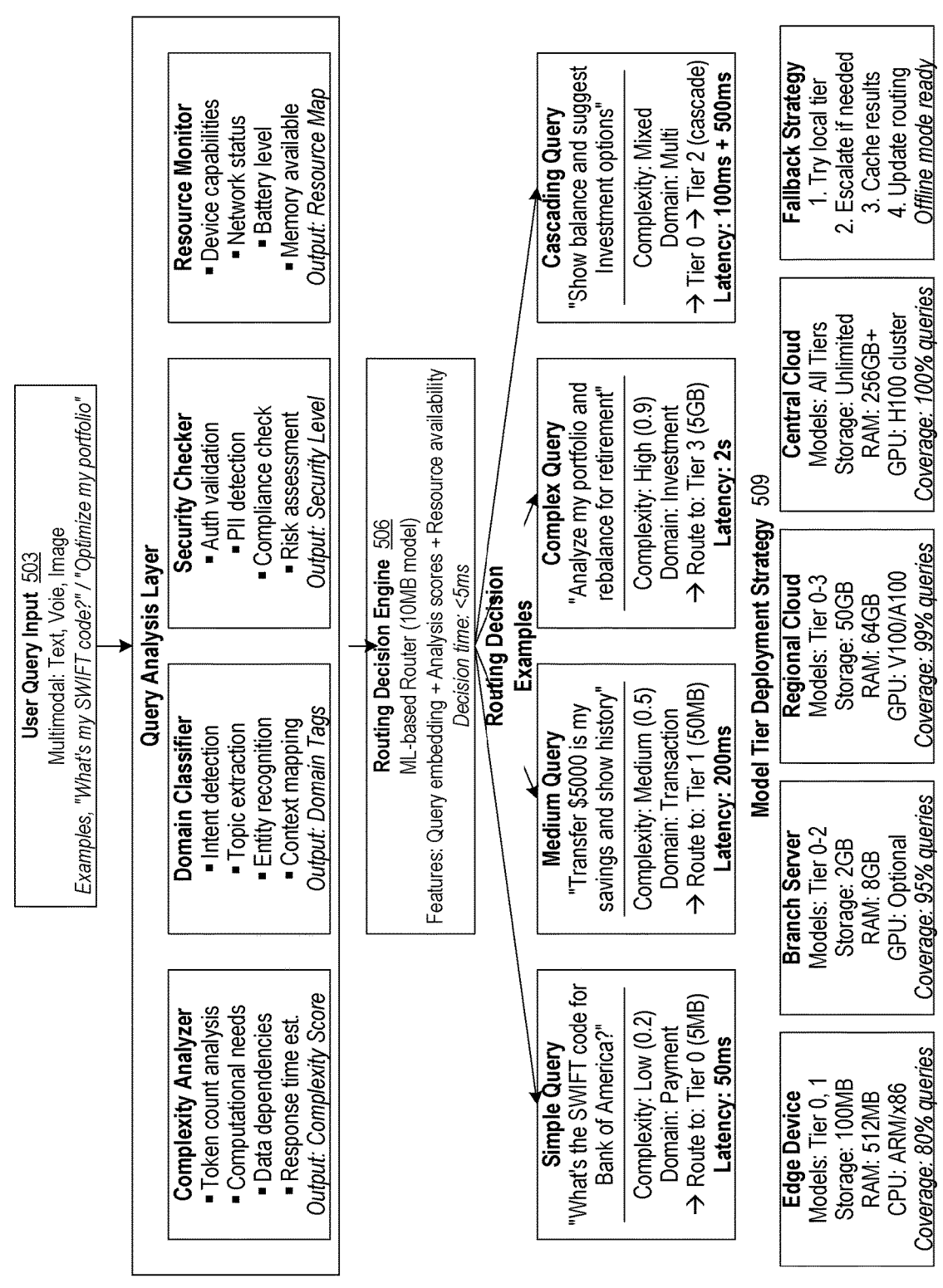
FIG. 5 illustrates query routing to various distilled generative models, in accordance with one or more embodiments of this disclosure.

Referring to FIG. 5, model generation system 160 may implement an intelligent query routing system that may analyze incoming requests and may direct these requests to appropriate specialized generative models based on computational complexity and domain requirements. The intelligent query routing system may enable efficient utilization of the hierarchical model structure by ensuring that queries may be processed by models with appropriate capabilities while minimizing computational overhead and response latency. The routing system may coordinate multiple analysis components that may evaluate different aspects of incoming requests to make optimal routing decisions across the deployment hierarchy.

A query input interface 503 may receive natural language requests from users across multiple input modalities including text, voice, and image data. Query input interface 503 may process diverse request formats and may standardize input representations for subsequent analysis by the routing system components. The query input interface 503 may handle requests such as "What's my SWIFT code?" for simple informational queries or "optimize my portfolio" for complex analytical tasks that may require different processing approaches and model capabilities. Query input interface 503 may implement input validation and preprocessing functions that may prepare requests for analysis while maintaining the semantic content and intent of the original user queries.

Query input interface 503 may implement multimodal input processing capabilities that may enable the system to handle text-based queries, voice commands, and image-based requests through unified processing pathways. The multimodal processing may involve converting voice inputs to text representations through speech recognition systems and may extract textual content from image inputs through optical character recognition when users may submit documents or screenshots containing their requests. The standardized input processing may ensure that all request types may be analyzed consistently by subsequent routing components regardless of the original input modality.

A routing engine 506 may analyze the natural language requests received through query input interface 503 and may determine appropriate routing destinations based on multiple evaluation criteria. Routing engine 506 may implement an ultra-lightweight machine learning model of ten megabytes that may make routing decisions in under five milliseconds, enabling real-time request processing with minimal computational overhead. The routing engine 506 may coordinate multiple specialized analyzers that may work in parallel to evaluate different aspects of incoming requests and may combine their outputs to make comprehensive routing decisions.

Routing engine 506 may include four specialized analyzers working in parallel to evaluate different characteristics of incoming natural language requests. A complexity analyzer within routing engine 506 may evaluate the computational requirements associated with each request by analyzing linguistic patterns, query structure, and domain-specific indicators that may suggest the level of processing complexity required for generating appropriate responses. The complexity analyzer may assign complexity scores ranging from simple informational lookups to sophisticated analytical tasks that may require substantial computational resources and specialized domain knowledge.

A domain classifier within routing engine 506 may identify the business domain associated with each natural language request through analysis of domain-specific terminology, contextual indicators, and semantic patterns that may indicate whether requests may relate to payment processing, investment advisory, customer service, or general banking operations. The domain classifier may enable routing engine 506 to direct requests to specialized models that may have been optimized for particular domain areas and may possess enhanced knowledge representations for specific business functions.

A security checker within routing engine 506 may validate authentication credentials and may assess compliance requirements associated with each natural language request to ensure that sensitive queries may be routed to appropriately secured processing environments. The security checker may evaluate user permissions, data sensitivity levels, and regulatory compliance requirements that may influence routing decisions and may ensure that requests containing sensitive financial information may be processed by models deployed in secure environments with appropriate access controls and audit capabilities.

A resource monitor within routing engine 506 may assess current hardware capabilities and system load conditions across different deployment environments to ensure that routing decisions may account for real-time resource availability and performance characteristics. The resource monitor may track computational utilization, memory availability, and network connectivity status across edge devices, branch servers, and cloud deployments to enable dynamic routing adjustments based on current system conditions and may prevent resource bottlenecks that may degrade response performance.

Routing engine 506 may determine, using a routing generative model, a request complexity level associated with the natural language request and that the natural language request may be associated with the category through systematic analysis of query characteristics and domain indicators. The routing generative model may process query embeddings generated from the natural language request and may combine analysis scores from the complexity analyzer, domain classifier, security checker, and resource monitor to produce comprehensive routing assessments. The request complexity level determination may involve evaluating factors including query length, semantic complexity, domain-specific terminology density, and computational requirements for generating appropriate responses.

The routing generative model may implement query embedding techniques that may convert natural language requests into numerical representations that may capture semantic meaning and structural characteristics relevant for routing decisions. The query embeddings may be processed through neural network architectures that may have been trained to recognize patterns associated with different complexity levels and domain categories, enabling the routing generative model to make accurate assessments of request characteristics based on learned representations of query patterns and their associated processing requirements.

Routing engine 506 may route, based on the request complexity level, the natural language request to a first specialized generative model of the plurality of specialized generative models through systematic matching of request requirements with model capabilities. The first specialized generative model may be associated with a complexity level that matches the request complexity level, ensuring that requests may be processed by models with appropriate computational capabilities and domain expertise. The routing process may consider both the complexity assessment and domain classification to select specialized models that may be optimized for the specific type of request being processed.

The routing decision process may involve mapping request complexity levels to corresponding model tiers within the hierarchical deployment structure. Simple queries such as SWIFT code lookups may be routed to Tier 0 micro-models that may provide rapid responses with minimal computational overhead and may achieve response latencies of approximately twenty-five milliseconds. Medium complexity queries such as transaction processing requests may be directed to Tier 1 edge models that may handle multi-step operations and may achieve response latencies of approximately two hundred milliseconds while maintaining acceptable accuracy levels for transactional tasks.

Complex analytical queries such as portfolio optimization requests may be routed to Tier 3 or Tier 4 specialist models that may possess sophisticated analytical capabilities and may achieve comprehensive analysis results with response latencies of approximately two and one-half seconds. The routing decisions may balance response time requirements with accuracy expectations and may ensure that complex queries may receive appropriate analytical depth while simple queries may achieve rapid response times through efficient processing pathways.

Routing engine 506 may implement a cascade architecture with failover mechanism that may enable simple models to escalate complex queries to more capable models for graceful handling of edge cases and unexpected query complexity. The cascade architecture may provide a hierarchical escalation pathway where models may recognize when incoming requests may exceed their processing capabilities and may automatically forward these requests to more sophisticated models within the hierarchy. The failover mechanism may ensure that system performance may be maintained even when initial routing decisions may not accurately assess query complexity or when simple models may encounter requests outside their intended scope.

The cascade failover process may involve confidence scoring mechanisms where specialized models may evaluate their ability to provide accurate responses to incoming requests and may trigger escalation when confidence levels may fall below predetermined thresholds. Models may analyze their internal processing states and may assess whether their responses may meet quality standards expected for the particular request type, enabling automatic escalation to more capable models when necessary to maintain response accuracy and user satisfaction.

A deployment strategy module 509 may coordinate the implementation of routing decisions across different deployment environments and may manage the distribution of specialized models to ensure optimal coverage and performance characteristics. Deployment strategy module 509 may organize model deployment across edge devices, branch servers, regional cloud infrastructure, central cloud resources, and fallback strategy components that may provide redundancy and reliability for the routing system. The deployment strategy coordination may ensure that routing decisions may be supported by appropriate model availability and may enable seamless request processing across diverse deployment scenarios.

Deployment strategy module 509 may specify model deployment configurations for different deployment tiers including storage requirements, processing capabilities, and query coverage percentages that may guide the allocation of specialized models across available hardware resources. Edge device deployments may be configured with Tier 0 and Tier 1 models requiring one hundred megabytes of storage and five hundred twelve megabytes of RAM while providing coverage for eighty percent of typical queries. Branch server deployments may include Tier 0 through Tier 2 models requiring two gigabytes of storage and eight gigabytes of RAM while achieving ninety-five percent query coverage for comprehensive banking services.

The deployment strategy may incorporate fallback mechanisms that may ensure system reliability and may provide alternative processing pathways when primary routing destinations may be unavailable due to hardware failures, network connectivity issues, or resource constraints. Deployment strategy module 509 may maintain backup model instances and may implement automatic failover procedures that may redirect requests to alternative processing environments when primary deployment locations may experience operational difficulties or performance degradation.

Routing engine 506 may coordinate with deployment strategy module 509 to ensure that routing decisions may account for current deployment status and model availability across different environments. The coordination process may involve real-time monitoring of deployment health and may enable dynamic routing adjustments based on system conditions, maintenance schedules, and performance optimization requirements. The integration between routing decisions and deployment strategy may ensure that the intelligent query routing system may maintain optimal performance characteristics while adapting to changing operational conditions and resource availability across the hierarchical model distillation system.

Referring to FIG. 4, model generation system 160 may demonstrate practical operation through three distinct use case scenarios that may illustrate how the hierarchical model distillation system may handle varying levels of computational complexity and domain-specific requirements. The use case scenarios may showcase the system's capability to process requests ranging from simple informational queries to sophisticated analytical tasks through appropriate model tier selection and specialized processing pathways. The scenarios may demonstrate how routing engine 506 may analyze different query characteristics and may direct requests to specialized generative models with matching computational capabilities and domain expertise.

A simple information request 400 may represent basic queries that may require minimal computational resources and may be processed efficiently by lightweight specialized models deployed at edge locations. Simple information request 400 may include queries such as "What's the SWIFT code for Bank of America?" that may involve straightforward information retrieval without complex reasoning or multi-step processing requirements. The simple information request 400 may be characterized by direct factual queries that may have predetermined answers and may not require sophisticated analytical capabilities or extensive computational resources for accurate response generation.

Model generation system 160 may process simple information request 400 through a streamlined workflow that may begin with query analysis by routing engine 506 to determine request characteristics and complexity levels. The complexity analyzer within routing engine 506 may evaluate the linguistic structure and semantic content of simple information request 400 and may assign a low complexity score of approximately 0.1 on a normalized scale, indicating minimal computational requirements for response generation. The domain classifier may identify simple information request 400 as belonging to the payment processing domain based on the presence of SWIFT-related terminology and banking institution references.

Routing engine 506 may route simple information request 400 to a Tier 0 micro-model based on the low complexity assessment and payment domain classification. The selected specialized generative model may be deployed on edge devices and may be optimized for rapid information retrieval tasks through cached computation techniques implemented by domain specialization module 215. The Tier 0 model may access pre-computed responses stored in local knowledge bases and may retrieve the requested SWIFT code information without requiring full neural network inference operations, enabling response generation with minimal computational overhead.

The processing of simple information request 400 may achieve response latency of approximately twenty-five milliseconds through direct lookup operations in embedded knowledge bases maintained by the edge-deployed specialized model. The response generation may utilize template-based formatting implemented through response template optimization techniques that may provide consistent response structures while minimizing computational requirements. The simple information request 400 may demonstrate the system's capability to handle routine informational queries efficiently through highly optimized lightweight models that may operate effectively in resource-constrained edge environments.

A multi-step task request 403 may represent queries with moderate complexity that may require sequential processing operations and may involve multiple data sources or validation steps for accurate response generation. Multi-step task request 403 may include queries such as "Transfer $5,000 to account ending in 4567 and show me my last 5 transactions" that may combine transactional operations with information retrieval tasks requiring coordinated processing across multiple system components. The multi-step task request 403 may be characterized by compound queries that may involve authentication, validation, transaction processing, and data retrieval operations that may require moderate computational resources and specialized domain knowledge.

Model generation system 160 may process multi-step task request 403 through a comprehensive workflow that may involve query decomposition, security validation, transaction processing, and response synthesis operations coordinated by routing engine 506 and specialized processing components. The complexity analyzer may evaluate multi-step task request 403 and may assign a moderate complexity score based on the presence of multiple operational components and the requirement for sequential processing steps. The domain classifier may identify the request as spanning payment processing and account management domains, requiring specialized models with capabilities across multiple banking functions.

Routing engine 506 may route multi-step task request 403 to a Tier 1 edge model that may possess enhanced processing capabilities compared to Tier 0 micro-models while maintaining deployment feasibility in branch or regional server environments. The selected specialized generative model may implement structured processing workflows that may decompose the compound request into individual operational components including transfer initiation, account validation, transaction execution, and transaction history retrieval. The security checker within routing engine 506 may validate user authentication credentials and may verify transfer authorization limits before enabling transaction processing operations.

The processing of multi-step task request 403 may involve coordinated operations across multiple system components including secure API interfaces for transaction processing, local data caches for transaction history retrieval, and response synthesis capabilities for combining multiple information sources into coherent natural language responses. The Tier 1 specialized model may execute transfer operations through secure banking APIs while simultaneously retrieving recent transaction data from local storage systems, enabling parallel processing of different request components to minimize overall response latency.

Multi-step task request 403 may achieve response latency of approximately two hundred milliseconds through optimized processing workflows that may balance thoroughness of operations with response time requirements. The response generation may combine transaction confirmation information with formatted transaction history data through natural language synthesis capabilities that may present complex information in user-friendly formats. The multi-step task request 403 may demonstrate the system's capability to handle moderately complex operational queries through specialized models that may coordinate multiple processing steps while maintaining acceptable response times for interactive applications.

A complex task 406 may represent sophisticated analytical queries that may require substantial computational resources, advanced domain expertise, and multi-stage processing workflows for comprehensive response generation. Complex task 406 may include queries such as "I'm 45 years old and want to retire at 65. Can you optimize my $500K portfolio for risk-adjusted returns?" that may involve portfolio analysis, risk assessment, optimization algorithms, and long-term financial projections requiring specialized quantitative capabilities. The complex task 406 may be characterized by analytical requirements that may exceed the capabilities of lightweight models and may necessitate deployment of sophisticated specialist models with advanced computational resources.

Model generation system 160 may process complex task 406 through a comprehensive analytical workflow that may involve query understanding, data gathering, risk analysis, optimization processing, Monte Carlo simulation, recommendation generation, and visualization components coordinated across multiple processing stages. The complexity analyzer within routing engine 506 may evaluate complex task 406 and may assign a high complexity score based on the presence of quantitative analysis requirements, long-term projection needs, and optimization algorithm demands that may require substantial computational resources and specialized domain knowledge.

Routing engine 506 may route complex task 406 to Tier 3 or Tier 4 specialist models deployed in cloud environments with substantial computational resources including high-performance processors, extensive memory capacity, and specialized acceleration hardware. The selected specialized generative models may implement sophisticated analytical capabilities including portfolio optimization algorithms, risk assessment frameworks, and Monte Carlo simulation engines that may have been preserved through selective pruning and quantization processes designed to maintain advanced analytical functionality.

The processing of complex task 406 may involve multiple sequential and parallel processing stages that may extract user parameters including age, retirement timeline, current portfolio value, and risk preferences from the natural language query. The specialist models may gather additional data including current portfolio allocation, historical performance metrics, market conditions, and risk profile assessments that may be required for comprehensive portfolio analysis. Risk analysis components may calculate current portfolio characteristics including Sharpe ratios, volatility measures, and maximum drawdown assessments that may inform optimization recommendations.

Complex task 406 may utilize advanced optimization engines that may implement mean-variance optimization algorithms, factor analysis techniques, and stress testing procedures to identify improved portfolio allocations that may achieve better risk-adjusted returns within the specified constraints. Monte Carlo simulation components may execute thousands of scenario analyses to project potential retirement outcomes under different market conditions and may generate confidence intervals for projected portfolio performance over the twenty-year investment horizon specified in the query.

The processing of complex task 406 may achieve comprehensive analytical results with response latency of approximately two and one-half seconds through coordinated utilization of specialized computational resources and optimized analytical algorithms. The response generation may include actionable rebalancing recommendations with specific asset allocation adjustments, tax consideration analysis, and projected growth scenarios presented through natural language explanations and supporting visualizations. The complex task 406 may demonstrate the system's capability to handle sophisticated analytical queries through specialist models that may provide comprehensive financial analysis while maintaining reasonable response times for professional applications.

The three use case scenarios may illustrate the cascading architecture capabilities of model generation system 160 where queries may be initially processed by appropriate model tiers based on complexity assessments, with escalation mechanisms available when initial processing may indicate requirements for more sophisticated analytical capabilities. The cascade architecture may enable simple models to recognize when queries may exceed their processing capabilities and may automatically forward requests to more capable models within the hierarchy, ensuring comprehensive coverage of query complexity ranges while maintaining optimal resource utilization across the deployment infrastructure.

Model generation system 160 may coordinate the processing of diverse query types through intelligent routing decisions that may balance response time requirements, computational resource availability, and accuracy expectations across the hierarchical model structure. The use case scenarios may demonstrate how the system may achieve efficient resource utilization by directing simple queries to lightweight edge models while reserving sophisticated cloud-based resources for complex analytical tasks that may require advanced computational capabilities and specialized domain expertise.

Model generation system 160 may coordinate comprehensive system integration that may enable seamless operation across all components of the hierarchical model distillation framework through systematic orchestration of distillation processes, deployment procedures, and runtime operations. The integrated system operation may begin with communication subsystem 162 receiving natural language requests for model generation and may proceed through coordinated workflows that may involve distillation subsystem 164, routing subsystem 166, and deployment infrastructure to create and deploy specialized generative models across diverse computational environments. The end-to-end integration may ensure that all system components may work in harmony to achieve optimal performance characteristics while maintaining consistency and reliability throughout the model lifecycle.

The initial hierarchy determination process may be coordinated between communication subsystem 162 and distillation subsystem 164 through systematic analysis of user requirements and computational constraints. Communication subsystem 162 may process natural language concepts and may extract domain specifications, complexity requirements, and deployment constraints that may inform hierarchy design decisions. Distillation subsystem 164 may receive these specifications and may coordinate with knowledge distillation module 206, structure pruning module 209, quantization module 212, and domain specialization module 215 to establish hierarchical structures that may optimize model capabilities across different deployment tiers while maintaining appropriate computational efficiency for each target environment.

The distillation workflow integration may involve coordinated operation of multiple optimization techniques that may be applied in systematic sequences to achieve comprehensive model optimization. Knowledge distillation module 206 may initiate the process by transferring learned representations from foundation model 203 to specialized student models through soft target training and attention alignment techniques. Structure pruning module 209 may subsequently analyze the distilled models and may remove redundant components based on domain-specific importance metrics and complexity level requirements. Quantization module 212 may then apply precision reduction techniques that may be coordinated with the pruning results to ensure optimal balance between computational efficiency and accuracy preservation.

Domain specialization module 215 may integrate with the distillation workflow by applying vocabulary reduction, task-specific fine-tuning, and response optimization techniques that may enhance model performance within designated domains while coordinating with the optimization results from previous processing stages. The domain specialization process may ensure that specialized models may achieve enhanced performance characteristics within their target domains while maintaining compatibility with the pruning and quantization optimizations applied during earlier processing stages. The integrated optimization workflow may result in specialized models that may achieve substantial computational efficiency improvements while preserving performance characteristics appropriate for their designated complexity levels and deployment environments.

Deployment coordination may involve systematic integration between distillation subsystem 164, routing subsystem 166, and communication subsystem 162 to ensure that optimized specialized models may be transmitted to appropriate deployment locations with necessary configuration parameters and optimization settings. Routing subsystem

166 may analyze the computational requirements and domain characteristics of each specialized model and may coordinate with deployment tier structure 303 to determine optimal deployment locations based on hardware capabilities and operational requirements. Communication subsystem 162 may manage secure transmission protocols that may ensure model integrity during transfer operations and may coordinate deployment verification procedures that may confirm successful installation and operation within target environments.

Runtime query processing integration may coordinate multiple system components to achieve efficient request handling across the hierarchical model structure through systematic workflow orchestration. Query input interface 503 may receive natural language requests and may coordinate with routing engine 506 to analyze request characteristics including complexity levels, domain classifications, security requirements, and resource availability assessments. Routing engine 506 may process these analyses through coordinated operation of complexity analyzers, domain classifiers, security checkers, and resource monitors that may work in parallel to generate comprehensive routing assessments within minimal processing timeframes.

The routing decision implementation may involve coordination between routing engine 506 and deployment strategy module 509 to ensure that routing decisions may be supported by appropriate model availability and deployment status across different computational environments. Deployment strategy module 509 may maintain real-time awareness of model deployment status, resource utilization levels, and system performance characteristics that may inform routing decisions and may enable dynamic load balancing across available specialized models. The integrated routing system may ensure that queries may be processed by appropriate specialized models while maintaining optimal resource utilization and response time characteristics across the deployment infrastructure.

Model generation system 160 may implement a continuous learning framework that may enable systematic updating of distilled models based on production data while maintaining model hierarchy integrity through coordinated feedback mechanisms and incremental optimization procedures. The continuous learning framework may monitor query patterns, response quality metrics, and user feedback across deployed specialized models and may identify opportunities for model improvement through additional training data, parameter adjustments, or architectural modifications that may enhance performance characteristics without disrupting the hierarchical structure or deployment configurations.

The continuous learning framework may coordinate data collection processes across deployed specialized models through systematic monitoring of query-response interactions, performance metrics, and user satisfaction indicators that may provide insights into model effectiveness and areas for improvement. Communication subsystem 162 may aggregate production data from multiple deployment environments and may coordinate secure transmission of anonymized performance data and query patterns to central processing systems where continuous learning algorithms may analyze trends and may identify optimization opportunities. The data collection process may ensure privacy protection and regulatory compliance while gathering sufficient information to support meaningful model improvements.

Continuous learning algorithms within the framework may analyze production data to identify patterns that may indicate model performance degradation, emerging query types that may not be adequately handled by current specialized models, or domain shifts that may require model adaptation to maintain optimal performance characteristics. The analysis process may involve statistical monitoring of response accuracy, latency trends, user satisfaction scores, and query complexity distributions that may reveal systematic changes in system utilization patterns or performance characteristics that may benefit from model updates or architectural adjustments.

The continuous learning framework may implement incremental model updating procedures that may apply targeted improvements to specialized models while preserving the hierarchical relationships and deployment optimizations that may have been established during initial distillation processes. Incremental updates may involve fine-tuning specialized models on new production data, adjusting quantization parameters based on observed performance characteristics, or modifying domain specialization configurations to better align with evolving query patterns and user requirements. The updating procedures may ensure that model improvements may be applied systematically across the hierarchy while maintaining consistency and compatibility between different model tiers.

Model hierarchy integrity maintenance may involve systematic validation procedures that may ensure continuous learning updates may not disrupt the cascading architecture or routing effectiveness that may be fundamental to system operation. The integrity maintenance process may involve testing updated models against established performance benchmarks, validating routing decision accuracy with modified model characteristics, and ensuring that cascade failover mechanisms may continue to operate effectively with updated model configurations. The validation procedures may prevent continuous learning updates from introducing inconsistencies or performance degradation that may compromise overall system effectiveness.

The continuous learning framework may coordinate with distillation subsystem 164 to implement systematic model refresh procedures that may periodically regenerate specialized models from updated foundation models or may incorporate accumulated learning improvements into new distillation workflows. The model refresh process may enable the hierarchical system to benefit from advances in foundation model capabilities while preserving the specialized optimizations and deployment configurations that may have been developed for specific domains and complexity levels. The refresh coordination may ensure that system evolution may occur systematically without disrupting operational continuity or requiring extensive redeployment procedures.

Integration between the continuous learning framework and routing subsystem 166 may enable dynamic adaptation of routing decisions based on observed model performance characteristics and changing query patterns that may emerge during production operation. The routing adaptation process may involve updating complexity assessment algorithms, domain classification models, and resource allocation strategies based on production data analysis and may ensure that routing decisions may remain optimal as system utilization patterns evolve over time. The adaptive routing capabilities may enable the system to maintain optimal performance characteristics while accommodating changing user requirements and operational conditions.

The continuous learning framework may implement feedback loops that may enable specialized models to benefit from performance insights gathered across the entire hierarchical system through systematic knowledge sharing and optimization coordination. Models deployed in different tiers may contribute performance data and optimization insights that may inform improvements across the hierarchy, enabling system-wide learning that may enhance overall effectiveness while maintaining the specialized characteristics that may be appropriate for each deployment environment. The feedback coordination may ensure that continuous learning benefits may be distributed effectively across the hierarchical structure while preserving the computational efficiency and domain specialization that may be fundamental to system operation.

System integration may enable comprehensive monitoring and management capabilities that may provide visibility into hierarchical model performance, resource utilization, and operational effectiveness across diverse deployment environments through coordinated telemetry collection and analysis procedures. The monitoring integration may coordinate data collection from edge devices, branch servers, and cloud deployments to provide comprehensive system visibility that may support operational decision-making, performance optimization, and capacity planning activities. The integrated monitoring capabilities may ensure that system administrators may maintain awareness of system performance characteristics and may identify optimization opportunities or operational issues that may require attention across the distributed deployment infrastructure.

Computing Environment

Figure 6:
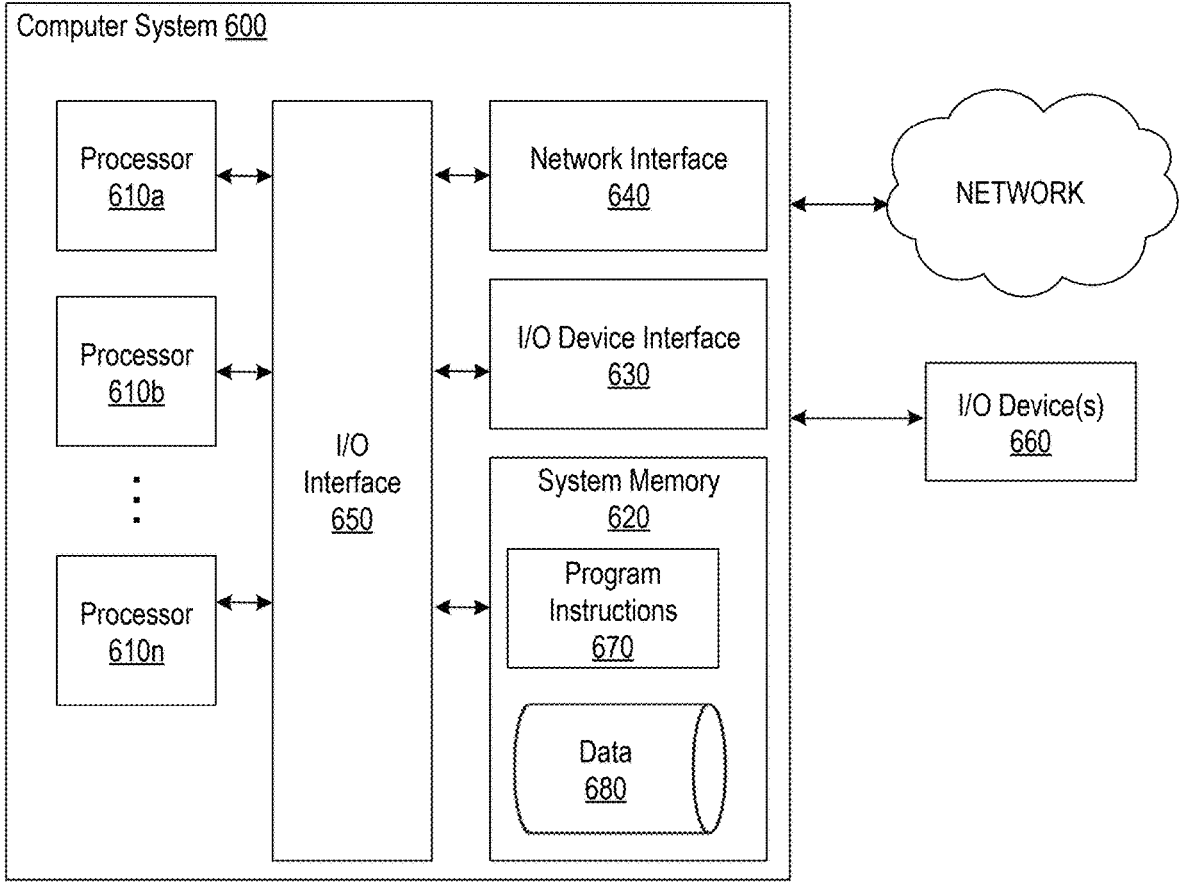
FIG. 6 illustrates an exemplary computing system, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*, 610*b*, 610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include nonvolatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
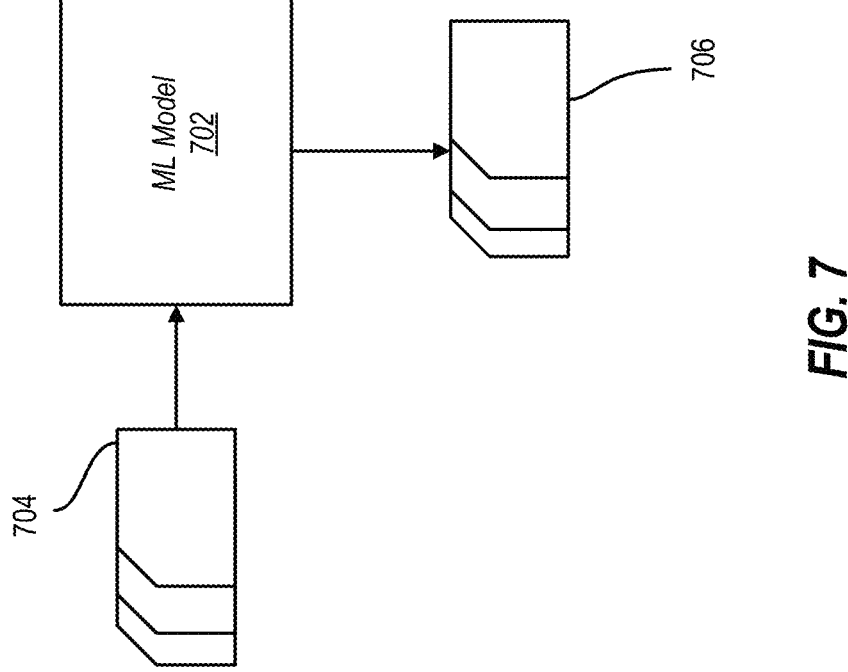
FIG. 7 illustrates exemplary machine learning models, in accordance with one or more embodiments of this disclosure.

FIG. 7 illustrates an exemplary machine learning model 702. According to some examples, the machine learning model may be any model, such as a model for data imputation. For example, the machine learning model may be trained to intake input 704. As a result of inputting the input 704 into the machine learning model, the model may then output an output 706, which may include, for example, an imputed value. Furthermore, as described, the machine learning model may be configured to output a confidence interval or other metric for certainty regarding the outputs. Output 706 may include output parameters.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., back-propagation of error). Updates to the connection weights may, for example, be reflective of the magnitude of error propagated backward after a forward pass has been completed.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification or imputation of the machine learning model, and an input known to correspond to that classification or imputation value may be input into an input layer of the machine learning model during training. During testing, an input without a known classification or known imputation value may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from publicly available sources. Such a technique may be used to identify values and generate a corpus that can be accessed to impute values. For example, in some embodiments, if a value is missing, the model may access the corpus to identify relevant information for the missing value. For example, the values can be used to calculate the missing value. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. The specific training samples may be used to generate language in a certain style or in a certain format.

Some concepts in ML-based language models will now be discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 8:
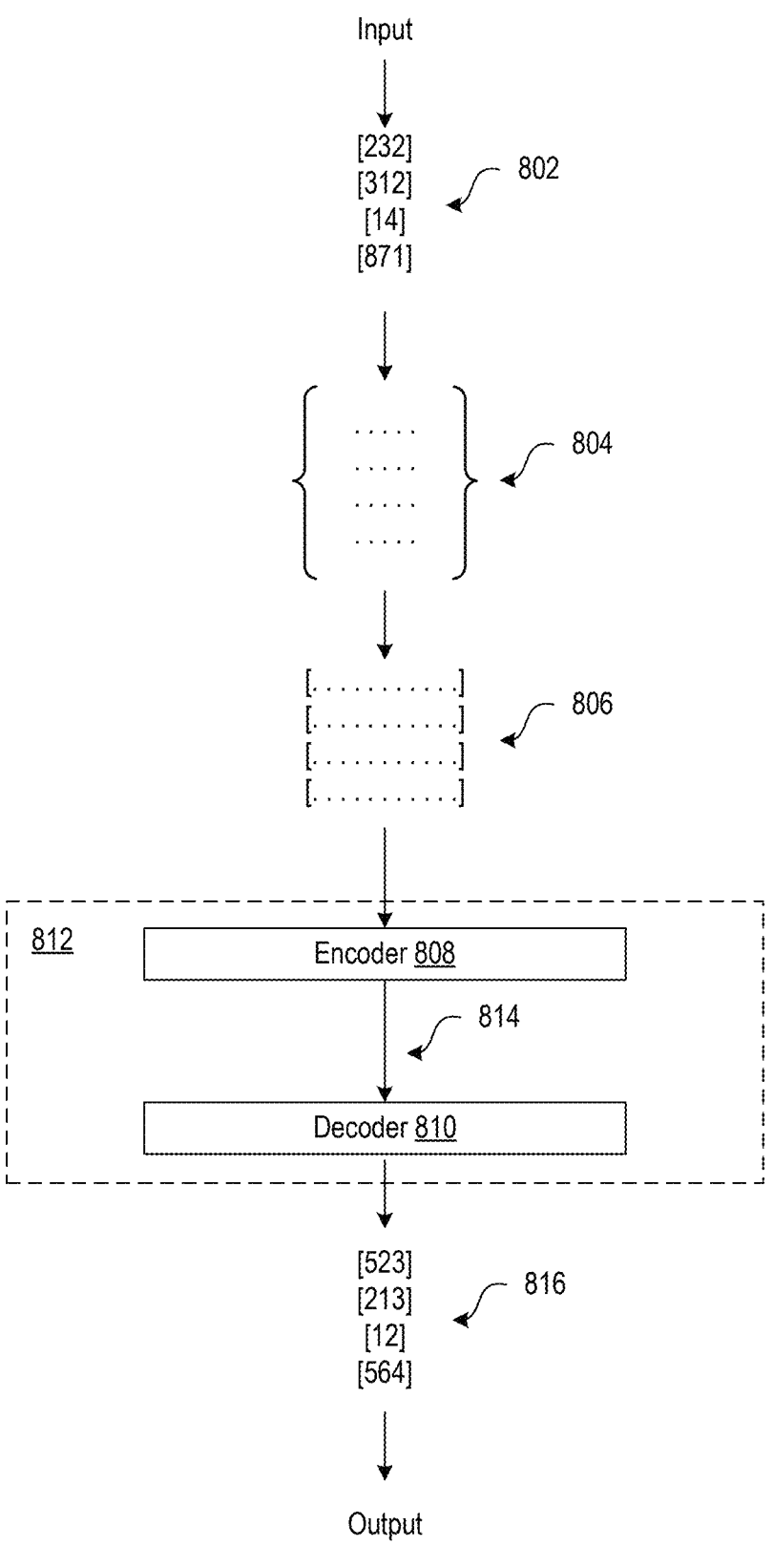
FIG. 8 is a block diagram of an example transformer that may be used for generative model distillation, in accordance with one or more embodiments of this disclosure.

FIG. 8 is a block diagram of an example transformer 812. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

Transformer 812 may include an encoder 808 (which may include one or more encoder layers/blocks connected in series) and a decoder 810 (which may include one or more decoder layers/blocks connected in series). Generally, encoder 808 and decoder 810 may each include multiple neural network layers, at least one of which may be a self-attention layer. The parameters of the neural network layers may be referred to as the parameters of the language model.

Transformer 812 may be trained to perform certain functions on a natural language input. Examples of the functions include summarizing existing content, brainstorming ideas, writing a rough draft, fixing spelling and grammar, and translating content. Summarizing may include extracting key points or themes from an existing content in a high-level summary. As described herein, it may take existing content from publicly available sources (e.g., text, images, etc.) to help in imputing missing values. Brainstorming ideas may include generating a list of ideas based on provided input. For example, the ML model may generate a list of names for a startup or costumes for an upcoming party. Writing a rough draft may include generating writing in a particular style that may be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, transformer 812 is trained to perform certain functions on other input formats than natural language input. For example, the input may include objects, images, audio content, or video content, or a combination thereof. In some examples, this may be used to generate commands for authorizing and completing the transaction, for example.

Transformer 812 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 8 illustrates an example of how transformer 812 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list, a paragraph), an [EOT] token may be another special token that indicates the end of the textual sequence, other tokens can provide formatting information, etc.

In FIG. 8, a short sequence of tokens 802 corresponding to the input text is illustrated as input to transformer 812. Tokenization of the text sequence into tokens 802 may be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted into transformer 812 may be of any length up to a maximum length defined based on the dimensions of transformer 812. Each token 802 in the token sequence is converted into an embedding 806 (also referred to as "embedding vector").

Embedding 806 is a learned numerical representation (such as, for example, a vector) of a token that captures some semantic meaning of the text segment represented by the token 802. Embedding 806 represents the text segment corresponding to token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, embedding 806 corresponding to the "write" token will be closer to another embedding corresponding to the "jot down" token in the vector space as compared to the distance between the embedding 806 corresponding to the "write" token and another embedding corresponding to the "summary" token.

The vector space may be defined by the dimensions and values of the embedding vectors. Various techniques may be used to convert token 802 into embedding 806. For example, another trained ML model may be used to convert token 802 into embedding 806. In particular, another trained ML model may be used to convert token 802 into embedding 806 in a way that encodes additional information into embedding 806 (e.g., a trained ML model may encode positional information about the position of token 802 in the text sequence into the embedding 806). In some implementations, the numerical value of token 802 may be used to look up the corresponding embedding in an embedding matrix 804, which may be learned during training of transformer 812.

The generated embeddings, e.g., such as embedding 806, are input into the encoder 808. Encoder 808 serves to encode embedding 806 into feature vectors 814 that represent the latent features of embedding 806. Encoder 808 can encode positional information (i.e., information about the sequence of the input) in feature vectors 814. Feature vectors 814 may have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that may be generated by encoder 808 may be referred to as a latent space or feature space.

Conceptually, decoder 810 is designed to map the features represented by feature vectors 814 into meaningful output, which may depend on the task that was assigned to transformer 812. For example, if transformer 812 is used for a translation task, decoder 810 may map feature vectors 814 into text output in a target language different from the language of the original tokens 802. Generally, in a generative language model, decoder 810 serves to decode feature vectors 814 into a sequence of tokens. Decoder 810 may generate output tokens 816 one by one. Each output token 816 may be fed back as input to decoder 810 in order to generate the next output token 816. By feeding back the generated output and applying self-attention, decoder 810 may generate a sequence of output tokens 816 that has sequential meaning (e.g., the resulting output text sequence is understandable as a sentence and obeys grammatical rules). Decoder 810 may generate output tokens 816 until a special [EOT] token (indicating the end of the text) is generated. The resulting sequence of output tokens 816 can then be converted to a text sequence in post-processing. For example, each output token 816 may be an integer number that corresponds to a vocabulary index. By looking up the text segment using the vocabulary index, the text segment corresponding to each output token 816 may be retrieved, the text segments may be concatenated together, and the final output text sequence can be obtained.

In some implementations, the input provided to transformer 812 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes).

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an API). Additionally or alternatively, such a remote language model may be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt may optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

The hierarchical model distillation process 900 begins with operation 902. At 902, the model distillation system determines a hierarchy for generating a plurality of specialized generative models from a large language model. During this hierarchy determination operation, computing system 600 may utilize processors 610a-610n to analyze computational requirements and domain specifications, while system memory 620 may store the hierarchical configurations and category definitions. Transformer 812 may be employed to process natural language concepts that define the desired model characteristics, with encoder 808 converting input requirements into feature vectors 814 that represent the complexity levels and domain categories needed for the hierarchy.

At 904, the model distillation system trains, using the large language model and based on the category, the plurality of specialized generative models. During this training operation, a training routine of machine learning model 702 may processes input 704 containing category-specific training data and generates output 706 in the form of trained specialized models. Computing system 600 may employ multiple processors 610a-610n to execute the knowledge distillation algorithms, while network interface 640 facilitates communication between the foundation model and student models. The transformer 812 may serve as the foundation model, with decoder 810 generating training responses that are used to teach the specialized models through soft target training and attention alignment techniques.

At 906, the model distillation system prunes, based on a corresponding associated complexity level, each specialized generative model. During this pruning operation, processors 610a-610n may analyze the importance of different model components, while system memory 620 may store the pruning metrics and threshold values. The transformer architecture may be systematically reduced by removing attention heads, layers, or neurons that contribute minimally to domain-specific performance, with the remaining components of encoder 808 and decoder 810 being optimized for the target complexity level.

At 908, the model distillation system quantizes, based on a corresponding accuracy level, each specialized generative model from a common precision factor to a corresponding precision factor. During this quantization operation, computing system 600 may utilize specialized processing capabilities to convert floating-point parameters to lower precision representations, while I/O interface 650 coordinates the parameter conversion processes. Transformer 812 parameters, including weights in embedding matrix 804 and feature vectors 814, may be systematically converted from 32-bit floating-point to 8-bit or 4-bit integer representations based on the target deployment environment.

At 910, the model distillation system determines, based on the corresponding complexity level, a corresponding location for each pruned specialized generative model," matching computational requirements with available hardware resources. During this location determination operation, network interface 640 may assess connectivity and resource availability across different deployment environments, while processors 610a-610n may analyze the computational demands of each specialized model. The system may evaluate whether models require the full capabilities of transformer 812 or can operate with reduced architectures suitable for edge deployment scenarios.

At 912, the model distillation system transmits one or more specialized generative models to the corresponding location," deploying the optimized models to their designated environments. During this transmission operation, network interface 640 may manage secure data transfer protocols, while I/O interface 650 may coordinate the packaging and deployment of model parameters. System memory 620 may store deployment configurations and verification checksums, ensuring that the transmitted models maintain integrity and can operate effectively within their target hardware environments, whether they utilize the full transformer 812 architecture or simplified variants optimized for specific deployment scenarios.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

A number of implementations have been described. Nevertheless, it will be understood that various modifications may be made without departing from the spirit and scope of the disclosure. Accordingly, other implementations are within the scope of the following claims.

1. An embodiment comprising: determining a hierarchy for generating a plurality of specialized generative models from a large language model, wherein the hierarchy comprises the plurality of specialized generative models associated with a category of a plurality of categories, and wherein each specialized generative model of the plurality of specialized generative models in the hierarchy is associated with a different complexity level of a plurality of complexity levels for performing tasks with different complexities; training, using the large language model and based on the category, the plurality of specialized generative models, wherein the plurality of specialized generative models is trained to provide responses to requests associated with the category; pruning, based on a corresponding associated complexity level, each specialized generative model of the plurality of specialized generative models, wherein each specialized generative model, when pruned, is enabled to respond to different requests of different complexity based on the corresponding associated complexity level; quantizing, based on a corresponding accuracy level, each specialized generative model from a common precision factor to a corresponding precision factor, wherein a given precision factor is associated with a corresponding complexity level of the plurality of complexity levels; determining, based on the corresponding complexity level of the plurality of complexity levels, a corresponding location of a plurality of locations for each pruned specialized generative model; and transmitting one or more specialized generative models to the corresponding location.

2. The method of any proceeding embodiments, further comprising: receiving a request to generate the plurality of specialized generative models, wherein the request comprises a natural language concept; generating, using the large language model, the category associated with the natural language concept; and determining the hierarchy based on the category.

3. The method of any proceeding embodiments, wherein the training the plurality of specialized generative models further comprises: generating, based on the category, a plurality of requests for the large language model to obtain a plurality of responses from the large language model, wherein each request in the plurality of requests is related to the category; and inputting the plurality of requests and the plurality of responses into a corresponding training routine of each specialized generative model of the plurality of specialized generative models, wherein each training routine trains each specialized generative model using the plurality of requests and the plurality of responses.

4. The method of any proceeding embodiments, wherein the pruning each specialized generative model of the plurality of specialized generative models further comprises: determining, for each portion of a plurality of portions of a first specialized generative model of the plurality of specialized generative models, a matching metric, wherein the matching metric indicates how well a corresponding portion of the plurality of portions matches the category, and wherein the plurality of portions comprises one of neurons, attention heads, or layers; and pruning one or more portions of the first specialized generative model where the matching metric does not meet a match threshold.

5. The method of any proceeding embodiments, wherein the pruning each specialized generative model of the plurality of specialized generative models further comprises: determining, a first specialized generative model of the plurality of specialized generative models, a plurality of tasks that the first specialized generative model is to be enabled to complete; identifying, one or more portions of a plurality of portions of the first specialized generative model that are not required for completing the plurality of tasks; and pruning the one or more portions of the first specialized generative model that are not required for completing the plurality of tasks.

6. The method of any proceeding embodiments, wherein the quantizing each specialized generative model from the common precision factor to the corresponding precision factor further comprises: determining, for each specialized generative model of the plurality of specialized generative models using the corresponding associated complexity level, the corresponding precision factor, wherein each corresponding precision factor comprises a number of bits representing model parameters, the model parameters comprising weights and activations; and updating, for each specialized generative model, the common precision factor with the corresponding precision factor, wherein the corresponding precision factor is different for each specialized generative model of the plurality of specialized generative models.

7. The method of any proceeding embodiments, further comprising: receiving a natural language request; determining, using a routing generative model, a request complexity level associated with the natural language request and that the natural language request is associated with the category; and routing, based on the request complexity level, the natural language request to a first specialized generative model of the plurality of specialized generative models, wherein the first specialized generative model is associated with a complexity level that matches the request complexity level.

8. The method of any proceeding embodiments, further comprising: receiving a natural language query comprising the category; and determining, based on the natural language query that the category comprises one or more of model size indicating a size parameter for one or more of the plurality of specialized generative models, a domain parameter indicating one or more topics for training the plurality of specialized generative models, or model location for one or more of the plurality of specialized generative models.

9. One or more non-transitory computer-readable media storing instructions thereon that, when executed by one or more processors, cause the one or more processors to perform the method of any of embodiments 1-8.

10. A system comprising means for performing the method of any of embodiments 1-8.

11. A system comprising memory and one or more processors for performing the method of any of embodiments 1-8.

The invention claimed is:

1. One or more non-transitory computer-readable media storing instructions thereon for distilling machine learning models, wherein the instructions cause one or more processors to:

determine a hierarchy for generating a plurality of specialized generative models from a large language model,
    wherein the hierarchy comprises the plurality of specialized generative models,
    wherein one or more of the plurality of specialized generative models are associated with a category of a plurality of categories, and
    wherein each specialized generative model of the plurality of specialized generative models in the hierarchy is associated with a different complexity level of a plurality of complexity levels for performing tasks with different complexities;
train, using the large language model and based on the category, the plurality of specialized generative models,
    wherein the plurality of specialized generative models is trained to provide responses to requests associated with the category;
prune, based on complexity levels of respective ones of the plurality of specialized generative models, each specialized generative model of the plurality of specialized generative models,
    wherein each specialized generative model, when pruned, is enabled to respond to different requests of different complexity levels based on a respective complexity level of each specialized generative model;
quantize, based on accuracy levels of respective ones of the specialized generative models, each specialized generative model from a common precision factor to a corresponding precision factor,
    wherein a given precision factor is associated with a corresponding complexity level of the plurality of complexity levels;
determine, based on the corresponding complexity level of the plurality of complexity levels, a corresponding location of a plurality of locations for each pruned specialized generative model; and
transmit one or more specialized generative models to the corresponding location.

2. The one or more non-transitory computer-readable media of claim 1, wherein the instructions further cause the one or more processors to:
receive a request to generate the plurality of specialized generative models, wherein the request comprises a natural language concept;
generate, using the large language model, the category of a plurality of categories,
    wherein the category of a plurality of categories is associated with the natural language concept; and
determine the hierarchy based on the category.

3. The one or more non-transitory computer-readable media of claim 1, wherein the instructions for training the plurality of specialized generative models further cause the one or more processors to:
generate, based on the category, a plurality of requests for the large language model to obtain a plurality of responses from the large language model, wherein each request in the plurality of requests is related to the category; and
input the plurality of requests and the plurality of responses into a corresponding training routine of each specialized generative model of the plurality of specialized generative models,

51 wherein each training routine trains each specialized generative model using the plurality of requests and the plurality of responses.

4. The one or more non-transitory computer-readable media of claim 1, wherein the instructions for pruning each specialized generative model of the plurality of specialized generative models further cause the one or more processors to:

determine, for each portion of a plurality of portions of a first specialized generative model of the plurality of specialized generative models, a matching metric, wherein the matching metric indicates how well a corresponding portion of the plurality of portions matches the category, and wherein the plurality of portions comprises one of neurons, attention heads, or layers; and prune one or more portions of the first specialized generative model where the matching metric does not meet a match threshold.

5. The one or more non-transitory computer-readable media of claim 1, wherein the instructions for pruning each specialized generative model of the plurality of specialized generative models further cause the one or more processors to:

determine, a first specialized generative model of the plurality of specialized generative models, a plurality of tasks that the first specialized generative model is to be enabled to complete;

identify, one or more portions of a plurality of portions of the first specialized generative model that are not required for completing the plurality of tasks; and prune the one or more portions of the first specialized generative model that are not required for completing the plurality of tasks.

6. The one or more non-transitory computer-readable media of claim 1, wherein the instructions for quantizing each specialized generative model from the common precision factor to the corresponding precision factor further cause the one or more processors to:

determine, for each specialized generative model of the plurality of specialized generative models using the respective complexity level of each specialized generative model, the corresponding precision factor, wherein each corresponding precision factor comprises a number of bits representing model parameters, the model parameters comprising weights and activations; and update, for each specialized generative model, the common precision factor with the corresponding precision factor, wherein the corresponding precision factor is different for each specialized generative model of the plurality of specialized generative models.

7. The one or more non-transitory computer-readable media of claim 1, wherein the instructions further cause the one or more processors to:

receive a natural language request;

determine, using a routing generative model, a request complexity level associated with the natural language request and that the natural language request is associated with the category; and route, based on the request complexity level, the natural language request to a first specialized generative model of the plurality of specialized generative models, wherein the first specialized generative model is associated with a complexity level that matches the request complexity level.

8. The one or more non-transitory computer-readable media of claim 1, wherein the instructions further cause the one or more processors to:

receive a natural language query comprising the category; and determine, based on the natural language query that the category comprises one or more of model size indicating a size parameter for one or more of the plurality of specialized generative models, a domain parameter indicating one or more topics for training the plurality of specialized generative models, or model location for one or more of the plurality of specialized generative models.

9. A method for distilling machine learning models, the method comprising:

determining a hierarchy for generating a plurality of specialized generative models from a large language model, wherein the hierarchy comprises the plurality of specialized generative models, wherein one or more of the plurality of specialized generative models are associated with a category of a plurality of categories, and wherein each specialized generative model of the plurality of specialized generative models in the hierarchy is associated with a different complexity level of a plurality of complexity levels for performing tasks with different complexities;

training, using the large language model and based on the category, the plurality of specialized generative models, wherein the plurality of specialized generative models is trained to provide responses to requests associated with the category;

pruning, based on complexity levels of respective ones of the plurality of specialized generative models, each specialized generative model of the plurality of specialized generative models, wherein each specialized generative model, when pruned, is enabled to respond to different requests of different complexity levels based on a respective complexity level of each specialized generative model;

quantizing, based on accuracy levels of respective ones of the specialized generative models, each specialized generative model from a common precision factor to a corresponding precision factor, wherein a given precision factor is associated with a corresponding complexity level of the plurality of complexity levels;

determining, based on the corresponding complexity level of the plurality of complexity levels, a corresponding location of a plurality of locations for each pruned specialized generative model; and transmitting one or more specialized generative models to the corresponding location.

10. The method of claim 9, further comprising:

receiving a request to generate the plurality of specialized generative models, wherein the request comprises a natural language concept;

generating, using the large language model, the category of a plurality of categories, wherein the category of a plurality of categories is associated with the natural language concept; and determining the hierarchy based on the category.

11. The method of claim 9, wherein training the plurality of specialized generative models further comprises:

generating, based on the category, a plurality of requests for the large language model to obtain a plurality of responses from the large language model, wherein each request in the plurality of requests is related to the category; and inputting the plurality of requests and the plurality of responses into a corresponding training routine of each specialized generative model of the plurality of specialized generative models, wherein each training routine trains each specialized generative model using the plurality of requests and the plurality of responses.

12. The method of claim 9, wherein pruning each specialized generative model of the plurality of specialized generative models further comprises:

determining, for each portion of a plurality of portions of a first specialized generative model of the plurality of specialized generative models, a matching metric, wherein the matching metric indicates how well a corresponding portion of the plurality of portions matches the category, and wherein the plurality of portions comprises one of neurons, attention heads, or layers; and pruning one or more portions of the first specialized generative model where the matching metric does not meet a match threshold.

13. The method of claim 9, wherein pruning each specialized generative model of the plurality of specialized generative models further comprises:

determining, a first specialized generative model of the plurality of specialized generative models, a plurality of tasks that the first specialized generative model is to be enabled to complete;

identifying, one or more portions of a plurality of portions of the first specialized generative model that are not required for completing the plurality of tasks; and pruning the one or more portions of the first specialized generative model that are not required for completing the plurality of tasks.

14. The method of claim 9, wherein quantizing each specialized generative model from the common precision factor to the corresponding precision factor further comprises:

determining, for each specialized generative model of the plurality of specialized generative models using the respective complexity level of each specialized generative model, the corresponding precision factor, wherein each corresponding precision factor comprises a number of bits representing model parameters, the model parameters comprising weights and activations; and updating, for each specialized generative model, the common precision factor with the corresponding precision factor, wherein the corresponding precision factor is different for each specialized generative model of the plurality of specialized generative models.

15. The method of claim 9, further comprising:

receiving a natural language request;

determining, using a routing generative model, a request complexity level associated with the natural language request and that the natural language request is associated with the category; and routing, based on the request complexity level, the natural language request to a first specialized generative model of the plurality of specialized generative models, wherein the first specialized generative model is associated with a complexity level that matches the request complexity level.

16. The method of claim 9, further comprising:

receiving a natural language query comprising the category; and determining, based on the natural language query that the category comprises one or more of model size indicating a size parameter for one or more of the plurality of specialized generative models, a domain parameter indicating one or more topics for training the plurality of specialized generative models, or model location for one or more of the plurality of specialized generative models.

17. A system comprising:

one or more processors; and one or more non-transitory, computer-readable media comprising instructions that, when executed by the one or more processors, cause the one or more processors to:

determine a hierarchy for generating a plurality of specialized generative models from a large language model, wherein the hierarchy comprises the plurality of specialized generative models, wherein one or more of the plurality of specialized generative models are associated with a category of a plurality of categories, and wherein each specialized generative model of the plurality of specialized generative models in the hierarchy is associated with a different complexity level of a plurality of complexity levels for performing tasks with different complexities;

train, using the large language model and based on the category, the plurality of specialized generative models, wherein the plurality of specialized generative models is trained to provide responses to requests associated with the category;

prune, based on complexity levels of respective ones of the plurality of specialized generative models, each specialized generative model of the plurality of specialized generative models, wherein each specialized generative model, when pruned, is enabled to respond to different requests of different complexity based on a respective complexity level of each specialized generative model;

quantize, based on accuracy levels of respective ones of the specialized generative models, each specialized generative model from a common precision factor to a corresponding precision factor, wherein a given precision factor is associated with a corresponding complexity level of the plurality of complexity levels;

determine, based on the corresponding complexity level of the plurality of complexity levels, a corresponding location of a plurality of locations for each pruned specialized generative model; and transmit one or more specialized generative models to the corresponding location.

18. The system of claim 17, wherein the instructions further cause the one or more processors to:

receive a request to generate the plurality of specialized generative models, wherein the request comprises a natural language concept;

generate, using the large language model, the category of a plurality of categories, wherein the category of a plurality of categories is associated with the natural language concept; and determine the hierarchy based on the category.

19. The system of claim 17, wherein the instructions for training the plurality of specialized generative models further cause the one or more processors to:

generate, based on the category, a plurality of requests for the large language model to obtain a plurality of responses from the large language model, wherein each request in the plurality of requests is related to the category; and input the plurality of requests and the plurality of responses into a corresponding training routine of each specialized generative model of the plurality of specialized generative models, wherein each training routine trains each specialized generative model using the plurality of requests and the plurality of responses.

20. The system of claim 17, wherein the instructions for pruning each specialized generative model of the plurality of specialized generative models further cause the one or more processors to:

determine, for each portion of a plurality of portions of a first specialized generative model of the plurality of specialized generative models, a matching metric, wherein the matching metric indicates how well a corresponding portion of the plurality of portions matches the category, and wherein the plurality of portions comprises one of neurons, attention heads, or layers; and prune one or more portions of the first specialized generative model where the matching metric does not meet a match threshold.

\* \* \* \* \*